United States Patent
Goto et al.

(10) Patent No.: US 12,548,353 B2
(45) Date of Patent: Feb. 10, 2026

(54) IMAGE PROCESSING APPARATUS SUPPORTING OBSERVATION OF OBJECT USING MICROSCOPE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Atsushi Goto, Kanagawa (JP); Shigeru Toriihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 17/665,355

(22) Filed: Feb. 4, 2022

(65) Prior Publication Data
US 2022/0262144 A1 Aug. 18, 2022

(30) Foreign Application Priority Data
Feb. 8, 2021 (JP) .................. 2021-018361

(51) Int. Cl.
  *G06V 20/69* (2022.01)
  *G06V 10/22* (2022.01)
  *G06V 10/70* (2022.01)
(52) U.S. Cl.
  CPC ............ *G06V 20/693* (2022.01); *G06V 10/22* (2022.01); *G06V 10/70* (2022.01)
(58) Field of Classification Search
  CPC ........ G06V 10/22; G06V 10/25; G06V 10/70; G06V 10/774; G06V 20/69–698;
  (Continued)

(56) References Cited

U.S. PATENT DOCUMENTS

2002/0061127 A1* 5/2002 Bacus .................... G06V 20/69
                                                               382/128
2007/0284525 A1* 12/2007 Kuribara .............. G01N 23/225
                                                               250/307
(Continued)

FOREIGN PATENT DOCUMENTS

JP       2018-054472 A      4/2018
JP       2019533847 A      11/2019
(Continued)

OTHER PUBLICATIONS

Daisuke Tasato; Jiro Fujita; "Infection Diagnosis from Gram Staining (Second edition)";(ISBN:978-4-7581-1739-5, Yodosha, Mar. 20, 2014); pp. 39 to 47 (JP original with English Translation).
(Continued)

*Primary Examiner* — Gregory A Morse
*Assistant Examiner* — Stefano Anthony Dardano
(74) *Attorney, Agent, or Firm* — Canon U.S.A., Inc., IP Division

(57) ABSTRACT

An image processing apparatus supports observation of an object using a microscope. The image processing apparatus includes an obtainment unit and specifying unit. The obtainment unit obtains an image captured from an object observed by using a microscope. The specifying unit specifies at least one area in the image that will be captured at an expanded magnification based on evaluation of a detection target included in the image and a magnification of the microscope in capturing the image.

15 Claims, 15 Drawing Sheets

(58) Field of Classification Search
CPC . G06T 7/11; G06T 2207/10056–10061; G06T 2207/10148
See application file for complete search history.

(56) References Cited

U.S. PATENT DOCUMENTS

| | | | |
|---|---|---|---|
| 2012/0002852 A1* | 1/2012 | Karasikov | G06V 20/69 382/128 |
| 2016/0267656 A1* | 9/2016 | Van Leeuwen | G06T 7/0014 |
| 2017/0061601 A1* | 3/2017 | Bryll | G06T 5/50 |
| 2017/0330327 A1* | 11/2017 | Ippolito | G02B 21/367 |
| 2018/0328848 A1* | 11/2018 | Murphy | G01N 33/57484 |
| 2019/0357888 A1* | 11/2019 | Miyake | G06V 10/25 |
| 2020/0234441 A1* | 7/2020 | Prabhudesai | G06T 7/70 |
| 2022/0028068 A1* | 1/2022 | Cosatto | G06F 18/214 |

FOREIGN PATENT DOCUMENTS

| | | |
|---|---|---|
| WO | 2012105281 A1 | 8/2012 |
| WO | 2020154203 A | 7/2020 |
| WO | 2020174863 A | 9/2020 |

OTHER PUBLICATIONS

Daisuke Tasato; Jiro Fujita; "Infection Diagnosis from Gram Staining (Second edition)";(ISBN:978-4-7581-1739-5, Yodosha, Mar. 20, 2014); pp. 39 to 47.

* cited by examiner

FIG. 7

| | MAGNIFICATION | THICKNESS OF SMEAR | STAINING STATE | NEUTROPHIL SQUAMOUS CELL (Geckler CLASSIFICATION) | FIBRIN DEPOSITION | CILIATED EPITHELIAL CELL (CASE OF SPUTUM) | PHAGOCYTOSIS IMAGE | BACTERIUM |
|---|---|---|---|---|---|---|---|---|
| | 701 | 702 | 703 | 704 | 705 | 706 | 707 | 708 |
| | 40 | 1 | 0.5 | 0.5 | 0 | 0 | 0 | 0 |
| | 100 | 1 | 1 | 1 | 0.5 | 0 | 0 | 0 |
| | 400 | 0.5 | 1 | 0.5 | 1 | 1 | 0.2 | 0.2 |
| | 1000 | 0 | 0 | 0 | 1 | 1 | 1 | 1 |

FIG. 9

| ASPECT OF HIGHLIGHT | INDEX i | EVALUATION VALUE [hi] | WEIGHTING COEFFICIENT TO MAGNIFICATION [wi] | WEIGHTED EVALUATION VALUE [hi × wi] |
|---|---|---|---|---|
| THICKNESS OF SMEAR | 1 | 1 | 0.5 | 0.5 |
| STAINING STATE | 2 | 1 | 1 | 1 |
| NEUTROPHIL·SQUAMOUS CELL | 3 | 0.8 | 0.5 | 0.4 |
| FIBRIN PRECIPITATION | 4 | 1 | 1 | 1 |
| FLUFFY EPITHELIAL CELL | 5 | 1 | 1 | 1 |
| PHAGOCYTOSIS IMAGE | 6 | 0 | 0.2 | 0 |
| BACTERIA | 7 | 0 | 0.2 | 0 |
| | - | - | TOTAL Σ wi=4.4 | TOTAL Σ (hi × wi)=3.9 |
| TOTAL EVALUATION | - | - | | Σ (hi × wi) / Σ wi =0.88 |

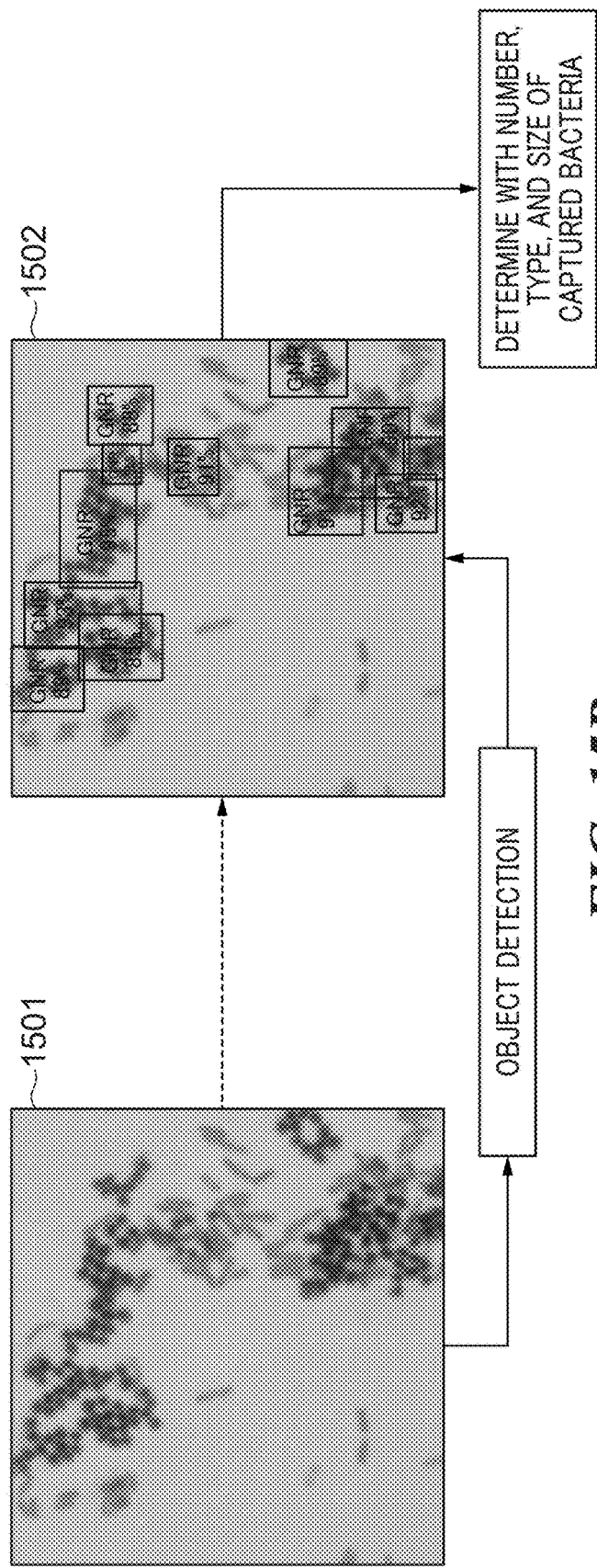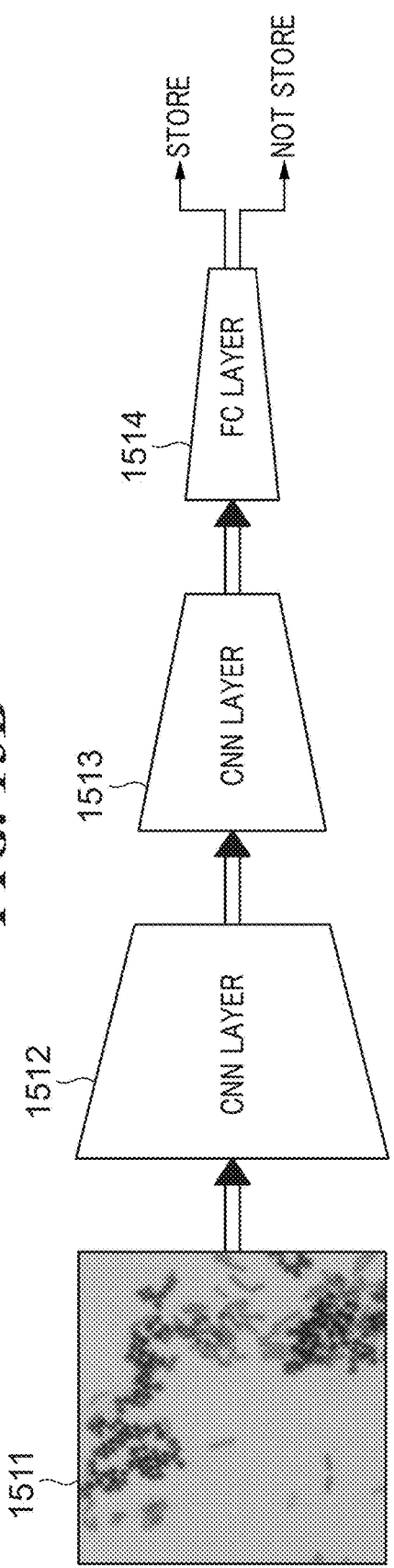

IMAGE PROCESSING APPARATUS SUPPORTING OBSERVATION OF OBJECT USING MICROSCOPE, CONTROL METHOD THEREFOR, AND STORAGE MEDIUM STORING CONTROL PROGRAM THEREFOR

BACKGROUND

Field of the Disclosure

The present disclosure relates to an image processing apparatus that supports observation of an object using a microscope, a control method therefor, and a storage medium storing a control program therefor.

Description of the Related Art

In general, in the Gram staining, an object including microbes is collected from a living body, the object is plastered to a slide glass, and a smear object is created by drying and fixing the object. Then, the created smear object is stained using stain solution. After that, the stained smear object is dried and is subjected to an examination using a microscope (a microscopic examination). The microscopic examination of microbes with the Gram staining aims to detect findings related to diagnosis and medical care of an infectious disease in an object, for example. Accordingly, when the microscopic examination is performed while changing a magnification of a microscope, it is necessary to retrieve a region suitable to specify microscopic-examination targets, such as microbes and inflammatory cells.

When a smear object is observed, it is necessary to check both findings of microbes and findings of a living body. See Pages 39 to 47 of "Infectious disease diagnosis from Gram staining (Second edition)" (ISBN:978-4-7581-1739-5, YODOSHA, Mar. 20, 2014). In the findings of microbes, a pattern of an accumulation is important information to estimate bacteria in addition to stainability and each configuration. Moreover, distribution in the entire smear object is also important information. In the meantime, in the findings of the living body, checking of a type and configuration of an appeared cell is required. When existence of a neutrophil with a clear cytoplasm is confirmed, it is discriminated that infection disease is fresh and active. Moreover, a portion in which fibrin deposits and a phagocytosis image is confirmed is also similar. An area in which these are confirmed is a suitable area for the microscopic examination. In a case of sputum, existence of a squamous cell means that saliva is mixed, and existence of a ciliated epithelial cell means that an object comes from a lower respiratory tract. Accordingly, since the areas including these cells are useful for diagnosis and medical care of infection disease, these areas are also suitable to the microscopic examination.

Japanese Laid-Open Patent Publication (Kokai) No. 2018-54472 (JP 2018-54472A) proposes a related technique. This technique presents information that supports evaluation by the M&J (Miller&Jones) classification and information that supports evaluation by the Geckler classification as information that evaluates propriety of sputum as an examination target.

As mentioned above, there are a plurality of suitable areas in observing a smear object (sample). Since the respective areas are subjected to the microscopic examination at different microscope magnifications, it is difficult to specify areas suitable for the microscopic examination. Particularly, when an operator (observer) retrieves areas suitable for the microscopic examination, a high-level skill is required for the operator in order to retrieve areas exactly. Moreover, a system in which a camera captures an object observed by a microscopic device and a display unit connected to the microscopic device displays a captured image may be used. When such a system is used, an operator needs to turn a visual line from an eyepiece lens of the microscopic device to the display unit, which becomes a burden to the operator.

From the above viewpoints, it is preferable to support observation of an object using a microscope. The technique of the above publication only classifies degree of the propriety of sputum as an examination target into a group of the M&J classification and a group of the Geckler classification and displays the information of the classifications. Accordingly, the technique cannot solve the above mentioned problem. Moreover, since evaluation criteria are only the number of cells and the amount of bacteria in the above-mentioned publication, it is difficult to specify areas suitable for the microscopic examination while synthesizing findings of microbes and findings of a living body.

SUMMARY

Various embodiments of the present disclosure provides an image processing apparatus that can support observation of an object using a microscope, a control method therefor, and a storage medium storing a control program therefor.

Accordingly, an aspect of the present disclosure provides an image processing apparatus including at least one processor configured to perform operations of; obtaining an image captured from an object observed by using a microscope, and specifying at least one area in the image that is to be captured at an expanded magnification based on evaluation of a detection target included in the image and a magnification of the microscope used for capturing the image.

According to the present disclosure, observation of an object using a microscope is supportable.

Further features will become apparent from the following description of exemplary embodiments with reference to the attached drawings.

BRIEF DESCRIPTION OF THE DRAWINGS

FIG. 7 is a view showing an example of a weighting coefficient table.

FIG. 9 is a view showing an example of a method for calculating a total evaluation value.

FIG. 15A and FIG. 15B are views showing a second example of the determination process by the discriminator.

DESCRIPTION OF THE EMBODIMENTS

Figure 1:
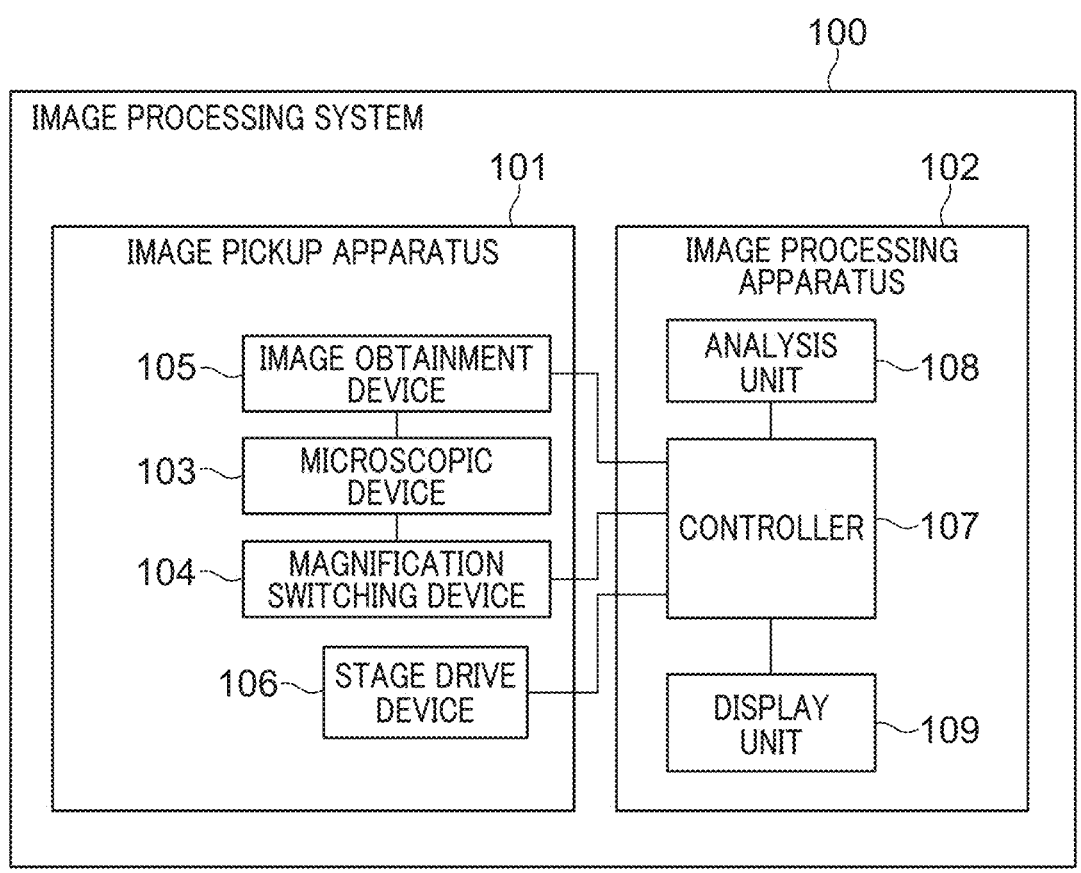
FIG. 1 is a block diagram showing an example of an image processing system according to a first embodiment.

Hereafter, some exemplary embodiments according to the present disclosure will be described in detail by referring to the drawings. However, the configurations described in the following embodiments are mere examples. And the scope of the present disclosure is not limited to the configurations described in the following embodiments.

Hereinafter, a first embodiment will be described. FIG. 1 is a view showing an example of an image processing system 100. The image processing system 100 includes an image pickup apparatus 101 and an image processing apparatus 102. In this embodiment, the image processing apparatus 102 controls the image pickup apparatus 101 to start capturing an object like a smear object at a low magnification and to output a captured image to the image processing apparatus 102. The image processing apparatus 102 analyzes the image obtained from the image processing apparatus 102, detects an area suitable for a microscopic examination, and moves a stage of a microscope so that the detected area will go into a capturing visual field of the image pickup apparatus 101. The image processing apparatus 102 controls the image pickup apparatus 101 so as to gradually raise the magnification in capturing an object. Then, the above-mentioned process is repeated. Thereby, the image processing apparatus 102 specifies an area suitable for the microscopic examination and obtains an image by capturing the specified area at a high magnification. Hereinafter, an area in which a detection target (a bacterium, microbe, or cell) is relatively easily specified at a high magnification will be described as a "highlight" in this embodiment. The above-mentioned points are similar in a second embodiment.

The image pickup apparatus 101 has a microscopic device 103, a magnification switching device 104, an image obtainment device 105, and a stage drive device 106. Moreover, the image processing apparatus 102 includes a controller 107, an analysis unit 108, and a display unit 109. The image pickup apparatus 101 obtains an image by the microscopic device 103 and image obtainment device 105, and outputs the image to the image processing apparatus 102. The image processing apparatus 102 analyzes the image obtained from the image pickup apparatus 101 and analyzes a highlight of an object. The image processing apparatus 102 may be integrated with the image pickup apparatus 101 or the microscopic device 103.

The microscopic device 103 is a microscope like a biological microscope used for observation of light transmitting objects, such as a cell, a bacterium, and a thin-sliced section of a living body tissue. The microscopic device 103 is constituted by including members, such as an objective lens, an eyepiece lens, a body, a stage, a beam splitter, and a mirror, for example. The objective lens of the microscopic device 103 has a plurality of lenses of which magnifications differ, which allows change of the magnification in observing an object. The microscopic device 103 may be an erect microscope or an inverted microscope. Moreover, light from an object as an observation target of the microscopic device 103 is divided by the beam splitter. A part of the light is guided to the eyepiece lens and the other part is guided to the image obtainment device 105 that is attached to the microscopic device 103.

The magnification switching device 104 automatically switches the magnification of the microscopic device 103. The magnification switching device 104 switches the magnification of the microscopic device 103 by switching the objective lens of the microscopic device 103, for example.

The image obtainment device 105 is constituted including a lens, a shutter, an image sensor, etc. The image obtainment device 105 is a camera like a digital camera, for example. The image sensor of the image obtainment device 105 is constituted by a charge accumulation solid-state image sensor, such as a CCD or a CMOS sensor, that converts an optical image into an electrical signal. The objective lens includes a diaphragm that defines an aperture value for adjusting an exposure amount. The shutter exposes and shades the image sensor by an opening and closing operation to control shutter speed. The shutter may be a mechanical shutter or an electronic shutter. In an image sensor using a CMOS sensor, the electronic shutter performs reset scan of pixels for every pixel or for every area that consists of a plurality of pixels (for example, for every line) to set an accumulated charge amount of a pixel to zero. After that, the pixels that are subjected to the reset scan are respectively scanned for every pixel or for every area after a predetermined period elapses.

The stage drive device 106 automatically drives the stage of the microscopic device 103 according to a signal from the controller 107. An object as an observation target is placed on the stage of the microscopic device 103. The object is fixed to a slide glass, for example.

The controller 107 of the image processing apparatus 102 controls the entire image processing system 100. In the example in FIG. 1, the controller 107 controls the magnification switching device 104, image obtainment device 105, stage drive device 106, analysis unit 108, and display unit 109. The analysis unit 108 obtains an image of an object that the image obtainment device 105 obtains and analyzes the obtained image of the object. The analysis unit 108 specifies an area suitable for the microscopic examination, i.e., a highlight area, from the image of the object. The display unit 109 displays the image of the object that the image obtainment device 105 obtains or the highlight area (the area suitable for the microscopic examination) that the analysis unit 108 outputs as an analysis result. The controller 107, analysis unit 108, and display unit 109 may be constituted by separated devices or may be constituted as an integrated device.

Figure 2:
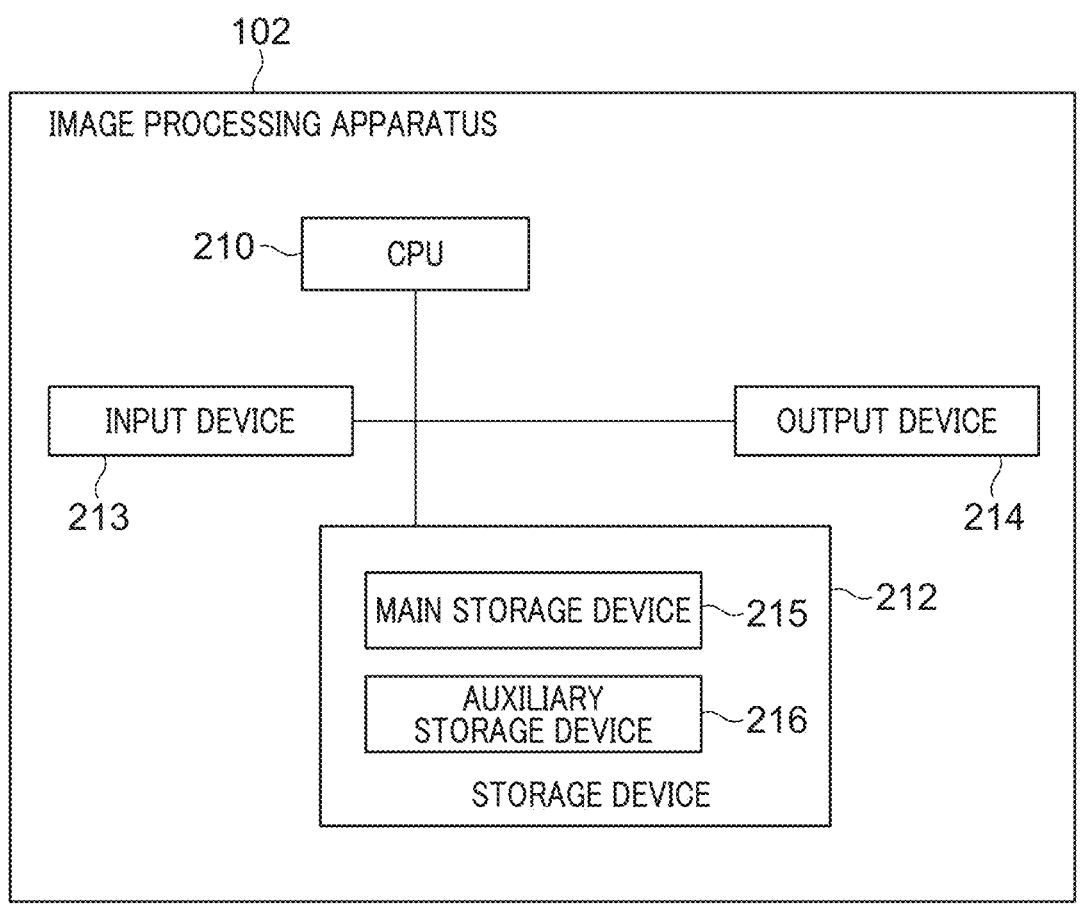
FIG. 2 is a block diagram showing an example of an image processing apparatus in FIG. 1.

FIG. 2 is a view showing an example of the image processing apparatus 102. The image processing apparatus 102 in FIG. 2 is constituted by integrating the controller 107, analysis unit 108, and display unit 109. The image processing apparatus 102 may include the controller 107, analysis unit 108, and display unit 109 as separate devices.

The image processing apparatus 102 has a CPU 210, a storage device 212, an input device 213, and an output unit 214. The CPU 210 achieves control of each embodiment by running a program stored in the storage device 212. The CPU 210 controls control of the image obtainment device 105, drive of the magnification switching device 104, drive of the stage drive device 106, an analysis process of the analysis unit 108, and a display process of the display unit 109.

The input device 213 includes a mouse, a keyboard, etc. Moreover, the input device 213 obtains an image from the image pickup apparatus 101 by an arbitrary protocol. A protocol, such as the PTP (Picture Transfer Protocol) or the WebAPI, that transfers images and meta information may be applied. The output unit 214 may be a display device like the display unit 109 or a device that outputs information to another apparatus. The storage device 212 includes a main storage device 215 like a RAM and an auxiliary storage device 216 like a magnetic disk device. The auxiliary storage device 216 may be an SSD (Solid State Drive).

Although the image processing apparatus 102 in FIG. 2 includes the single CPU 210 and the single storage device 212, the image processing apparatus 102 may include a plurality of CPUs and a plurality of storage devices. In this case, the process of each embodiment is achieved by the CPUs that run predetermined programs stored in the storage devices. The CPU 210 may be replaced with an FPGA, an ASIC, or the like.

Figure 3:
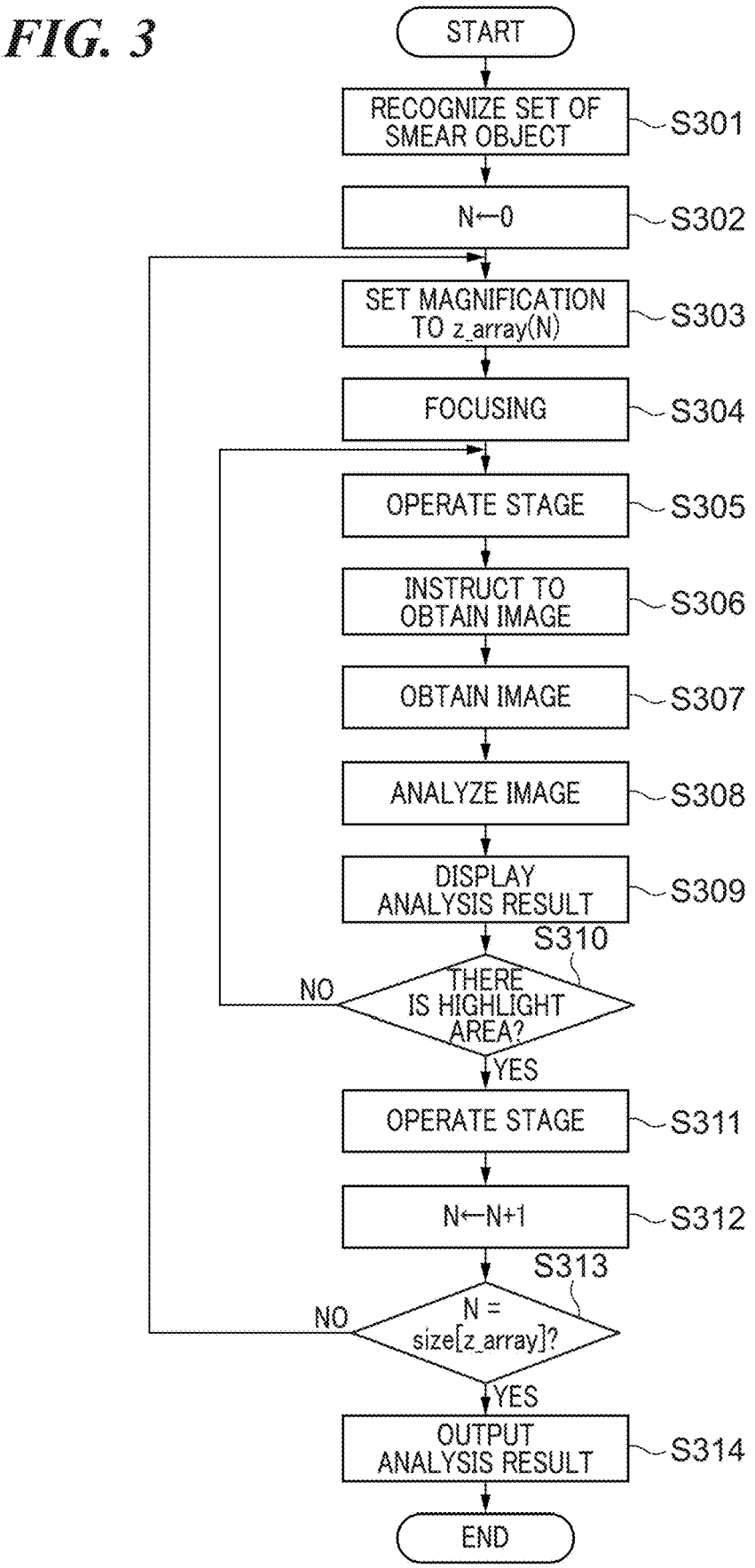
FIG. 3 is a flowchart showing an example of a flow of a process that the image processing apparatus in the first embodiment executes.

FIG. 3 is a flowchart showing an example of a flow of a process that the image processing apparatus 102 in the first embodiment executes. The process in FIG. 3 is performed by the CPU 210 that runs a program stored in the storage device 212. The CPU 210 achieves functions of the controller 107 and analysis unit 108. First, an operator sets a smear object (sample) to the microscopic device 103. In this embodiment, although the smear object is described assuming that the smear object is generated using sputum as an object, the smear object is not limited to this. In a step S301, the CPU 210 recognizes that the smear object is set to the microscopic device 103.

In a step S302, the CPU 210 sets a variable N to zero. N is a natural number. In a step S303, the CPU 210 controls the magnification switching device 104 to set the magnification of the microscopic device 103 to "z_array (N)". An array "z_array" shows the magnifications that are settable to the microscopic device 103 and is stored by the CPU 210. In this embodiment, the microscopic device 103 can select a magnification from among a plurality of kinds of magnifications more than a predetermined number. The microscopic device 103 shall be able to select a magnification from among magnifications of 40 times, 100 times, 400 times, and 1000 times. In this case, the array "z_array" is denoted by the following formula (1).

$$z_{array[4]} = \{40, 100, 400, 1000\} \quad (1)$$

The number of kinds of magnifications that can be set to the microscopic device 103 is obtained by counting the number of elements of the array "z_array." In this embodiment, the magnifications that can be set to the microscopic device 103 are four kinds, 40 times, 100 times, 400 times, and 1000 times. Accordingly, "size (z_array)" that shows the number of kinds of magnifications that can be set to the microscopic device 103 is "4". The magnification of the microscopic device 103 can be expressed by using the variable N as an index of the array "z_array". In the step S302 mentioned above, the variable N is set to zero. The magnification set to the microscopic device 103 at this time is 40 times. The variable N will be incremented as mention later. Thereby, the magnification of the microscopic device 103 set in the step S303 increases stepwisely. The magnification of the microscopic device 103 may be set by the CPU 210 or may be manually set by an operator.

In a step S304, the CPU 210 controls the microscopic device 103 so as to focus on the smear object. The focus of the microscopic device 103 may be adjusted manually by an operator. In a step S305, the CPU 210 controls the stage drive device 106 to perform a stage operation. The CPU 210 controls the stage drive device 106 to drive the stage of the microscopic device 103 so that the observation area will include a place determined as a highlight area obtained as an analysis result. Moreover, the stage of the microscopic device 103 may be adjusted to be located at a desired target position by a manual operation of an operator to the stage drive device 106.

In a step S306, the CPU 210 outputs an image obtainment instruction to the image obtainment device 105. For example, when the operator operates to obtain an image using the input device 213, the CPU 210 outputs the image obtainment instruction to the image obtainment device 105 in response to reception of the operation concerned. Moreover, the CPU 210 may output the image obtainment instruction to the image obtainment device 105 in response to completion of the stage operation in S305 as a trigger.

The image obtainment device 105 captures an image of the smear object on the stage according to the image obtainment instruction. The image obtainment device 105 outputs the captured image of the smear object to the image processing apparatus 102. In a step S307, the CPU 210 obtains the image of the smear object that is captured by the image obtainment device 105 from the image pickup apparatus 101. In a step S308, the CPU 210 analyzes the image obtained from the image obtainment device 105 and specifies an area suitable for the microscopic examination at a current magnification from among a plurality of areas. The process in the step S308 is performed by the analysis unit 108. Hereinafter, the image analysis in the step S308 will be described.

There are a plurality of kinds of aspects for specifying a highlight area. Then, it is preferable to evaluate the kinds of aspects comprehensively in order to specify a highlight area. A microscope magnification suitable for evaluation depends on an aspect. For example, a thickness of the smear is one of the aspects. A low magnification (40 times through 100 times) is suitable for the microscope magnification in observing a thickness of a smear. Moreover, a phagocytosis image is one of the aspects. The microscope magnification of 400 times or more is required in observing a phagocytosis image. Accordingly, the microscope magnification set up depends on an aspect to be observed. For example, when an image is evaluated while setting the microscope magnification to 100 times, a thickness of a smear is detectable by a high detection accuracy, but a detection accuracy of a phagocytosis image is lowered.

In this embodiment, the CPU 210 weights an evaluation value of a highlight based on a kind of aspect and a magnification. Thereby, even if the microscope magnification is changed, the highlight can be evaluated comprehensively. For example, when evaluating the image obtained in setting the microscope magnification to 100 times, the CPU 210 increases the weighting coefficient to the evaluation value of the thickness of the smear and decreases weight to the evaluation value of the phagocytosis image. This is because the image obtained in setting the microscope magnification to 100 times is high in a detection accuracy of the thickness of the smear but is low in a detection accuracy of the phagocytosis image. Thereby, an evaluation value of a highlight can be obtained in a high accuracy at each of the microscope magnifications.

Figure 4:
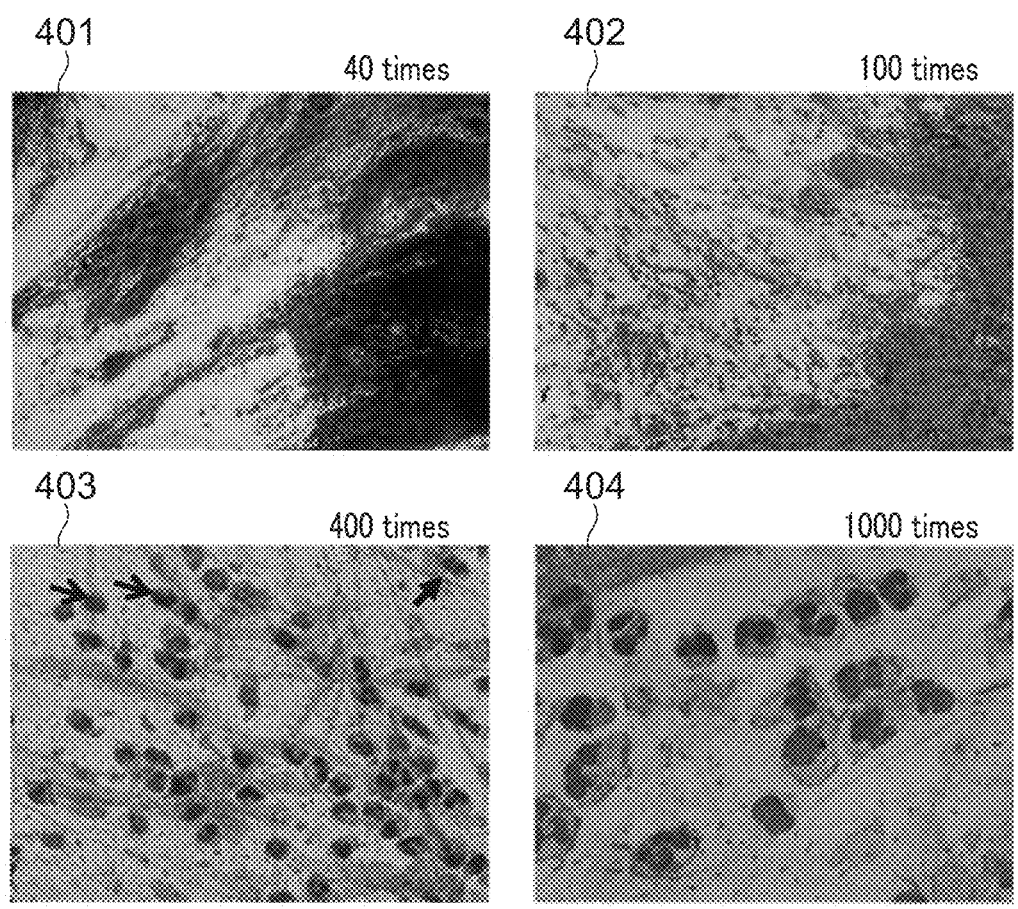
FIG. 4 is a view showing examples of images captured at a plurality of microscope magnifications.
Figure 5:
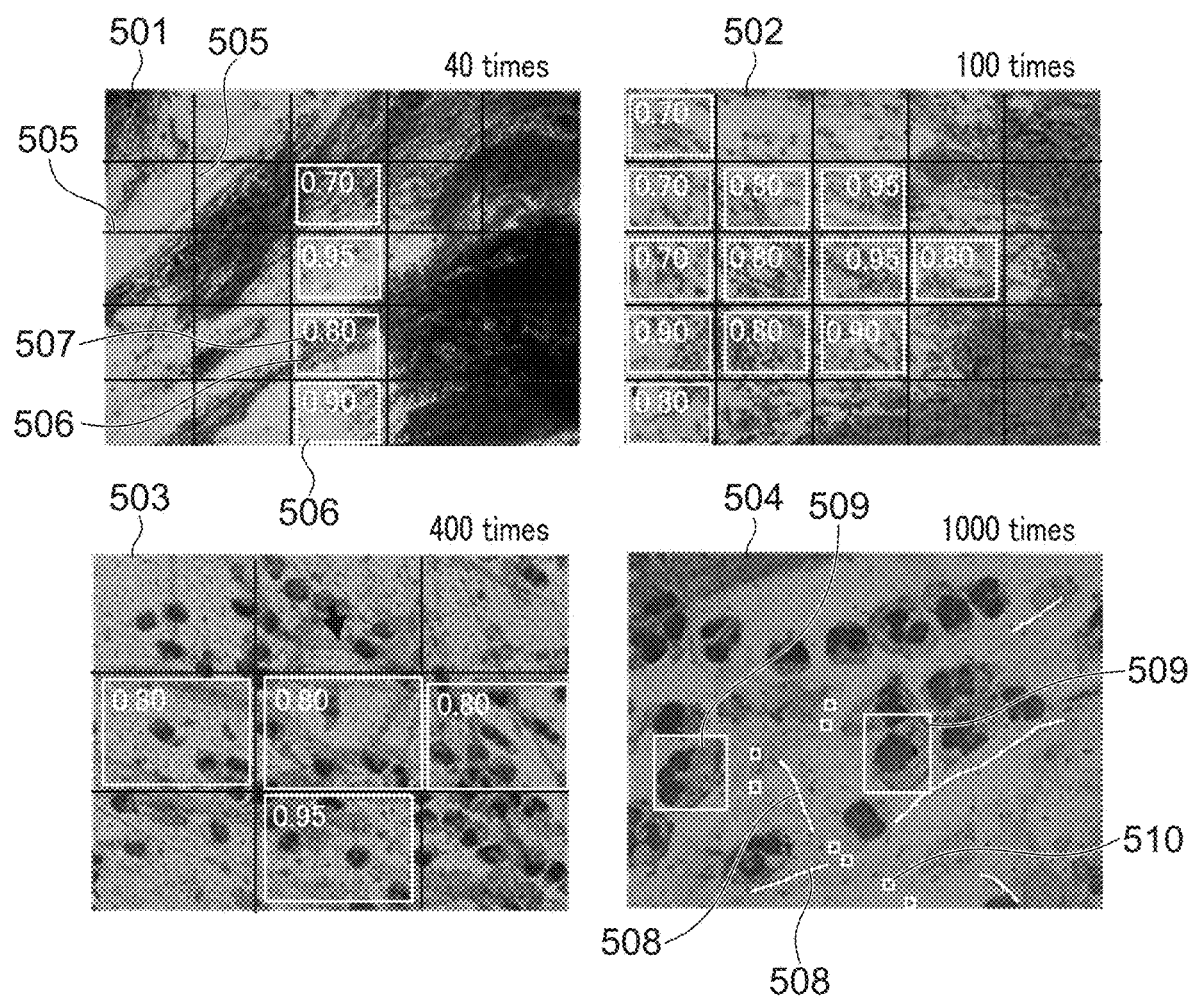
FIG. 5 is a view showing examples of images on which analysis results are superimposed.

FIG. 4 is a view showing examples of images captured at a plurality of microscope magnifications. Images 401, 402, 403, and 404 in FIG. 4 respectively show the examples that are captured at the microscope magnifications of 40 times, 100 times, 400 times, and 1000 times. The CPU 210 divides an image into a plurality of areas in analyzing the image. FIG. 5 is a view showing examples of images on which analysis results are superimposed. The images 501, 502, 503, and 504 in FIG. 5 respectively correspond to the images 401, 402, 403, and 404 in FIG. 4. As shown in FIG. 5, each of the images 501 through 504 is divided into latticed areas (areas sectioned by a grid 505). The CPU 210 superimposes a total evaluation value 507 in each area. The total evaluation value 507 shows a degree of a highlight at a microscope magnification expanded next time. Since the total evaluation value 507 is superimposed in each area, an operator can check which area will be a highlight area at a microscope magnification that is expanded next time from among the plurality of areas. The details of the total evaluation value 507 will be mentioned later.

In this embodiment, at least one area of which the total evaluation value 507 is equal to or more than a predetermined threshold is a highlight area among all the areas. In the following description, the predetermined threshold shall equal "0.7". The predetermined threshold may be a value other than "0.7". The CPU 210 emphatically displays at least one highlight area of which the total evaluation value 507 is equal to or more than "0.7" among all the areas. In the examples in FIG. 5, the CPU 210 displays the highlight areas distinguishably by superimposing white frames 506 on the highlight areas. Since the image on which the white frames 506 are superimposed is displayed on the display unit 109, the operator can easily determine which area is a highlight area among the plurality of areas of the image.

As shown in FIG. 5, each of the images 501 and 502 is divided into the areas of 5-line and 5-row, and the image 503 is divided into the areas of 3-line and 3-row. The number of divided areas in an image can be set up arbitrarily. For example, the CPU 210 may set the number of divided areas (an area size) in an image on the basis of relation between a microscope magnification prior to expansion and a microscope magnification that is expanded next time. In such a case, since an area corresponding to a visual field at the microscope magnification that is expanded next time is determined as a highlight area in an image at the microscope magnification prior to expansion, efficiency of retrieval of a highlight area improves. Moreover, although the CPU 210 divides the image into the latticed areas in FIG. 5, the image may be divided by another method. Alternatively, the CPU 210 may set areas so that parts of adjacent areas will overlap or may set areas so that a space will be inserted between adjacent areas.

The image 504 in FIG. 5 shows an example that is obtained by superimposing analysis results on an image that is captured at the maximum magnification of the microscopic device 103. The maximum magnification of the microscopic device 103 of this embodiment is 1000 times. The CPU 210 does not divide an image obtained at the maximum magnification into areas. The CPU 210 detects an object as a highlight itself in the image 504 captured at the maximum magnification. Long fibrins 508, macrophages 509, and bacteria 510 are detected in the image 504 in FIG. 5.

Semantic segmentation (semantic area division) is used for detection of the fibrins 508, for example. A learned model that achieves the semantic segmentation is obtained by machine learning (deep learning). For example, the learned model that achieves the semantic segmentation that divides the area of the fibrin can be obtained by performing the deep learning using learning sets consisting of images of fibrins and correct answer labels. The CPU 210 detects the fibrins 508 by performing an inference process of the image 504 using the learned model that achieves the semantic segmentation. The fibrins 508 may be detected by methods, such as pattern matching.

In the embodiments, when the image processing apparatus 102 contains a GPU, the machine learning (deep learning) may be performed by the GPU, may be performed by the CPU 210, or may be performed by collaboration of the CPU 210 and GPU. Moreover, arbitrary machine learning algorithms, such as a support vector machine and a decision tree, are applicable to the method of the machine learning besides the deep learning. For example, a neural network suitable for the inference process is obtained by performing the deep learning using the learning sets mentioned above to a neural network of three or more layers.

The macrophages 509 and bacteria 510 that have block shapes are detected by object detection, for example. The learned model that achieves the object detection is obtained by the machine learning (deep learning). For example, the learned model that achieves the object detection that detects the macrophages and bacteria is obtained by performing the deep learning using learning sets consisting of images of macrophages and bacteria and corresponding correct answer labels. The CPU 210 detects the macrophages 509 and bacteria 510 by performing an inference process of the image 504 using the learned model that achieves the object detection. The macrophages 509 and bacteria 510 may be detected by methods, such as the pattern matching.

Figure 6:
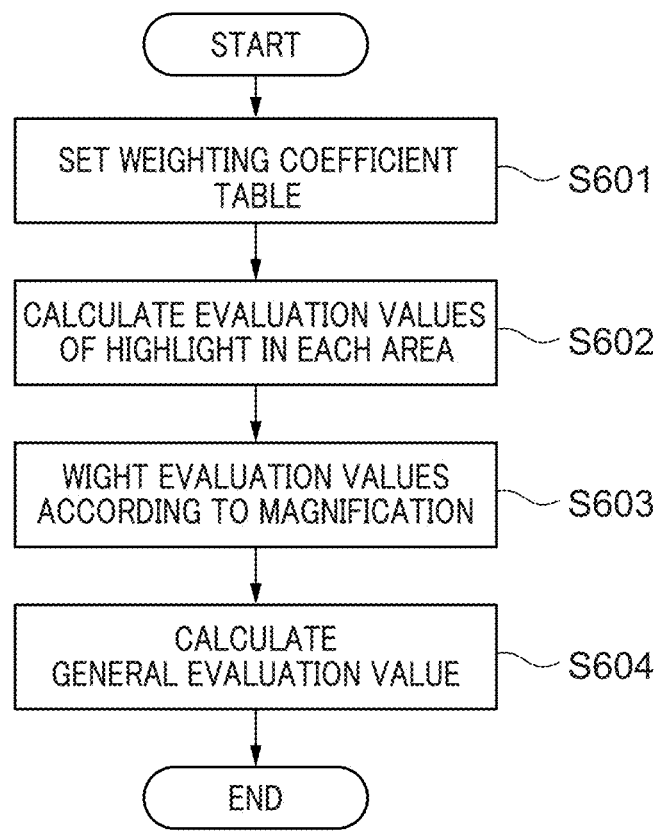
FIG. 6 is a flowchart showing an example of a flow of an area analysis process.

As mentioned above, the CPU 210 that achieves the function of the analysis unit 108 analyzes and specifies a suitable area according to the microscope magnification. FIG. 6 is a flowchart showing an example of a flow of an area analysis process. A process of the flowchart in FIG. 6 corresponds to the process in the S308 in FIG. 3.

In a step S601, the CPU 210 sets a weighting coefficient table. The CPU 210 sets a weighting coefficient that weights an evaluation value of a highlight at a certain microscope magnification to every component of a matrix formed between the highlight aspects and the microscope magnifications. A weighting coefficient falls within a range of "0 to 1". As mentioned above, a microscope magnification suitable for evaluation depends on an aspect of a highlight (a highlight aspect). Accordingly, a higher weighting coefficient is set to a magnification suitable for a highlight determination in a certain aspect and a lower weighting coefficient is set to a magnification unsuitable for a highlight determination in the certain aspect in the weighting coefficient table. When a weighting coefficient of an aspect is zero at a certain microscope magnification, the aspect does not contribute to the highlight determination at the certain microscope magnification. FIG. 7 is a view showing an example of the weighting coefficient table 700.

The weighting coefficient table 700 has columns 701, 702, 703, 704, 705, 706, 707, and 708. The column 701 defines the microscope magnifications. In this embodiment, since the microscope magnifications are 40 times, 100 times, 400 times, and 1000 times, the weighting coefficient table 700 has lines corresponding to the respective magnifications defined in the column 701. The columns 702 through 708 correspond to the highlight aspects. The column 702 defines weighting coefficients about a thickness of a smear, the column 703 defines weighting coefficients about a stain state, the column 704 defines weighting coefficients about a neutrophil and squamous cell, the column 705 defines weighting coefficients about fibrin deposition, the column 706 defines weighting coefficients about a ciliated epithelial cell, the column 707 defines weighting coefficients about a phagocytosis image, and the column 708 defines weighting coefficients about bacteria.

Each weighting coefficient in the weighting coefficient table 700 in FIG. 7 may be any value. A highlight aspect of each column in the weighting coefficient table 700 in FIG. 7 may be another aspect. The highlight aspects may be set in the weighting coefficient table 700 on the basis of a collection origin of an object in a human body. A collection origin of an object may be sputum, urine, excrement, blood, skin pus, cerebrospinal fluid, for example. When a collection origin of an object is sputum, the neutrophil and squamous cell, and the ciliated epithelial cell are effective as highlight aspects. In the meantime, when a collection origin of an object is other than sputum, it is preferable to except the neutrophil and squamous cell, and the ciliated epithelial cell from the highlight aspects.

A step S602 in FIG. 6 will be described. In the step S602, the CPU 210 calculates the evaluation values of the highlight aspects in each area. Then, the CPU 210 weights the calculated evaluation values in a step S603. Hereinafter, the calculation method of the evaluation values about the highlight aspects will be described. In this embodiment, the CPU 210 analyzes the obtained image and determines the evaluation values of the highlight aspects in a range of "0 through 1". In this embodiment, the highlight aspects are the items of the columns 702 through 708 in FIG. 7.

Evaluation of the thickness of the smear will be described. The CPU 210 evaluates the thickness of the smear in a range of "0 through 1" on the basis of the obtained image. In this embodiment, a luminance range corresponding to a thickness range of the smear under predetermined brightness of a light source is set up beforehand. Then, the CPU 210 calculates an evaluation value on the basis of average luminances of the respective areas of the obtained image. For example, the CPU 210 may set an evaluation value to "1" about an area of which an average luminance is included in a preset suitable luminance range. And the CPU 210 may set an evaluation value to "0" about another area.

The CPU 210 may set the evaluation value to an area of which an average luminance is not included in the preset suitable luminance range to any value between "0" and "1". For example, the CPU 210 may set the evaluation value to "0.5" about an area of which an average luminance exceeds the suitable luminance range by about 20%. This enables the detailed evaluation of the thickness of the smear.

Evaluation of the stain state will be described. The CPU 210 evaluates a degree of staining in a range of "0 to 1" on the basis of the obtained image. For example, the CPU 210 detects a neutrophil for every area of the obtained image and sets an evaluation value for every target area in which a neutrophil is detected. That is, the CPU 210 sets an evaluation value to "1" about a target area of which an average luminance of the neutrophil is more than a preset luminance, and sets an evaluation value to "0" about a target area of which an average luminance of the neutrophil is less than the preset luminance. Then, the CPU 210 evaluates a luminance similarly about a background area in which no neutrophil is detected. When the evaluation values of all the target areas and background areas in an attention region are "1", the CPU 210 sets an evaluation value about the stain state in the attention region to "1". The CPU 210 may set the evaluation value about the stain state to any value between "0" and "1" in the same manner as with the evaluation of the thickness of the smear.

Evaluation of the neutrophil and squamous cell will be described. The CPU 210 applies the object detection to the obtained image and detects a neutrophil and a squamous cell for every area. The learned model obtained by the machine learning is applicable to the object detection. Then, the CPU 210 counts the number of objects recognized as neutrophils and the number of objects recognized as squamous cells for every area. The CPU 210 classifies the evaluation target areas into groups of the Geckler classification on the basis of the counted numbers. At this time, the CPU 210 classifies the evaluation target areas into six groups from a first group to a sixth group. The Geckler classification is an evaluation index of sputum that is expanded by 100 times and is seen, and is a method evaluating by the numbers of the neutrophils and squamous cells that are seen in the sputum.

In the Geckler classification, evaluation target areas are classified into the six groups from the first group to the sixth group. An area in which the number of white corpuscles is less than "10" and in which the number of squamous cells is more than "25" is classified into the first group. An area in which the number of white corpuscles is between "10" and "25" and in which the number of squamous cells is more than "25" is classified into the second group. An area in which the number of white corpuscles is more than "25" and in which the number of squamous cells is more than "25" is classified into the third group. An area in which the number of white corpuscles is more than "25" and in which the number of squamous cells is between "10" and "25" is classified into the fourth group. An area in which the number of white corpuscles is more than "25" and in which the number of squamous cells is less than "10" is classified into the fifth group. An area in which the number of white corpuscles is less than "25" and in which the number of squamous cells is less than "25" is classified into the sixth group.

The Geckler classification is assumed so as to count cells in a visual field of which the magnification is 100 times. Accordingly, when the magnification of each area in the visual field is not 100 times, each area is classified after changing the numbers of the cells that are criteria of the classification in proportion to the size of the visual field.

In this embodiment, when the area is classified into the fifth group that is most suitable for the object evaluation, the CPU 210 sets the evaluation value to "1" about the highlight evaluation of the neutrophil and squamous cell. Moreover, when the area is classified into the fourth group that is next suitable for the object evaluation, the CPU 210 sets the evaluation value to "0.8". When the area is classified into other groups, the CPU 210 sets the evaluation value to "0".

Next, evaluation of the fibrin deposition will be described. The CPU 210 applies the semantic segmentation (semantic area division) to detect a fibrin. The learned model obtained by the machine learning is applicable to the semantic segmentation. The CPU 210 determines whether a fibrin is included for every area. As a result of the determination, the CPU 210 sets an evaluation value to "0.8" about an area that includes only one fibrin, sets an evaluation value to "1" about an area that includes a plurality of fibrins, and sets an evaluation value to "0" about an area that includes no fibrin. Since a fibrin has a fibrous shape, the semantic segmentation that can detect a position for every pixel is more suitable than the object detection for a rectangle.

Figure 8:
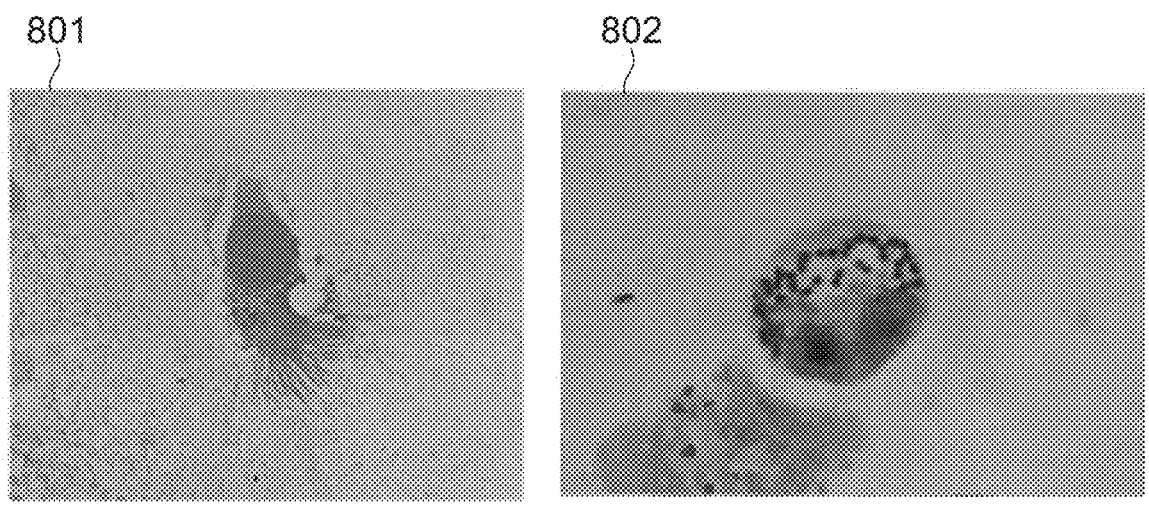
FIG. 8 is a view showing examples of images of a ciliated epithelial cell and a phagocytosis image.

Evaluation of a ciliated epithelial cell will be described. The CPU 210 detects a ciliated epithelial cell from the obtained image using the object detection. The learned model obtained by the machine learning is applicable to the object detection. Then, the CPU 210 determines whether a ciliated epithelial cell is included for every area. The CPU 210 sets an evaluation value to "1" about an area that includes at least one ciliated epithelial cell and sets an evaluation value to "0" about an area that includes no ciliated epithelial cell. An image 801 in FIG. 8 is a view showing an example of a ciliated epithelial cell.

Evaluation of a phagocytosis image will be described. The CPU 210 detects a phagocytosis image from the obtained image using the object detection. The learned model obtained by the machine learning is applicable to the object detection. The CPU 210 determines whether a phagocytosis image is included for every area. The CPU 210 sets an evaluation value to "1" about an area that includes at least one phagocytosis image and sets an evaluation value to "0" about an area that includes no phagocytosis image. An image 802 in FIG. 8 is a view showing an example of a phagocytosis image. A phagocytosis image shows a phenomenon where a neutrophil that is a cell occupying 50% through 70% of white corpuscles migrates (moves) to an organ from a blood vessel and takes in (phagocytoses) bacteria. Accordingly, the phenomenon that bacteria are taken into a neutrophil becomes one characteristic feature.

Evaluation of bacteria will be described. The CPU 210 designates a kind of bacteria of retrieval targets beforehand and detects designated bacteria from the obtained image using the object detection. The learned model obtained by the machine learning is applicable to the object detection. The CPU 210 sets an evaluation value to "1" about an area that includes the designated bacteria and sets an evaluation value to "0" about an area that does not include the designated bacteria. The CPU 210 can retrieve the designated bacteria more suitably by avoiding to detect bacteria like indigenous bacteria that are not focused. Bacteria can be classified into four groups "GNR", "GNC", "GPR", and "GPC". Furthermore, the "GPC" is classified into two subgroups "GPC Chain" and "GPC Cluster" according to a shape. The CPU 210 may detect bacteria according to the classification. The highlight aspects corresponding to the above items of the columns 702 through 708 may be evaluated using an arbitrary method other than the above mentioned method.

The evaluation value that the CPU 210 evaluates in the step S602 in FIG. 6 is an evaluation value of each highlight aspect based on the image captured at an arbitrary magnification. In the meantime, as shown in the weighting coefficient table 700 in FIG. 7, a weighting coefficient of each highlight aspect depends on the magnification. In the step S603, the CPU 210 calculates a weighted evaluation value by multiplying the weighting coefficient corresponding to the microscope magnification obtaining the image (the image captured by the image pickup apparatus 101) to the evaluation value (first evaluation value) evaluated in the step S602. In a step S604, the CPU 210 calculates a total evaluation value (second evaluation value) on the basis of the weighted evaluation values about the highlight aspects.

FIG. 9 is a view showing an example of a method for calculating the total evaluation value. An evaluation value "hi" (0≤hi≤1) is obtained by evaluating a highlight aspect "i" in a predetermined area of an image captured at a magnification z. The CPU 210 calculates a weighted evaluation value about each highlight aspect by multiplying a weighting coefficient "wi" to the evaluation value "hi". A weighted evaluation value is denoted by "hi·wi". The index i is a value indicating a highlight aspect. The CPU 210 calculates the sum "Σwi" of the weighting coefficients corresponding to the magnification and the sum "Σ(hi·wi)" of the weighted evaluation values about all the indices i. The CPU 210 performs normalization so that the maximum value will become "1" by dividing the sum "Σ(hi·wi)" of the weighted evaluation values by the sum "Σwi" of the weighting coefficients. The total evaluation value of the area obtained in this time is denoted by the following formula (2).

$$\text{Total Evaluation Value} = \frac{\sum(hi \cdot wi)}{\sum wi} \qquad (2)$$

FIG. 9 shows an example where the magnification z of the captured image is 400 times. A column 901 in a table 900 shows the highlight aspects. A column 902 shows indices from "1" to "7" allocated to the seven highlight aspects. A column 903 shows the evaluation values "hi" (first evaluation values) of the respective highlight aspects calculated in the step S602. A column 904 shows the weighting coefficients "wi" corresponding to the magnification. In the example in FIG. 9, since the magnification z is 400 times, the weighting coefficients in the line of 400 times in FIG. 7 are shown for the respective highlight aspects. The values in the column 904 depend on the magnification z. A column 905 shows the weighted evaluation values "hi·wi" each of which is obtained by multiplying a corresponding weighting coefficient to the evaluation value "hi".

In this embodiment, the weighting coefficient "wi" falls within a range of "0 through 1". Accordingly, the sum "Σ(hi·wi)" of the weighted evaluation values is equal to or less than the sum "Σwi" of the weighting coefficients. That is, the maximum value of the sum "Σ(hi·wi)" of the weighted evaluation values is equal to the sum "Σwi" of the weighting coefficients. In the example in FIG. 9, the sum "Σwi" of the weighting coefficients becomes "4.4" and the sum "Σ(hi·wi)" of the weighted evaluation values becomes "3.9". Accordingly, the total evaluation value "Σ(hi·wi)/Σwi" of the area becomes "0.88". The total evaluation value (second evaluation value) shows the evaluation of the highlight at the magnification of 400 times. The total evaluation value falls within a range of "0 through 1". Even when the magnification is other than 400 times, a total evaluation value is obtained by the similar method. The image is analyzed as mentioned above in the step S308 of the flowchart in FIG. 3. Then, the CPU 210 specifies areas suitable for the microscopic examination at the capturing magnification from among a plurality of areas on the basis of the total evaluation values obtained as the image analysis result and the predetermined threshold. When the threshold is set to "0.7" as mentioned above, the CPU 210 specifies an area of which the total evaluation value is equal to or more than "0.7" in the step S308.

In a step S309, the CPU 210 controls so as to display the image analysis result. As shown in the images 501, 502, and 503 in FIG. 5, the CPU 210 divides each image into rectangular areas. Then, the CPU 210 calculates each total evaluation value of each area in the step S308. The CPU 210 emphatically displays an area of which the total evaluation value is equal to or more than the threshold "0.7" and superimposes the total evaluation value in the area that is emphatically displayed. The CPU 210 displays the image as the image analysis result, which emphasizes the areas and superimposes the total evaluation values, on the display unit 109.

In a step S310, the CPU 210 determines whether there is any highlight area among all the areas of the image. For example, when there is no area of which the total evaluation value is equal to or more than the threshold "0.7", the CPU 210 determines that there is no highlight area (NO in the step S310). In this case, the CPU 210 returns the flow to the step S305 and controls the stage drive device 106 to move the stage of the microscopic device 103. Then, the CPU 210 executes the process from the step S305. In the meantime, when there is at least one area of which the total evaluation value is equal to or more than the threshold "0.7", the CPU 210 determines that there is at least one highlight area (YES in the step S310). In this case, the CPU 210 proceeds with the flow to a step S311.

In the step S311, the CPU 210 controls the stage drive device 106 to move the stage so that the highlight area will be located at the center of the visual field of the microscopic device 103. When there are two or more highlight areas, the CPU 210 selects one of the highlight areas before controlling the stage drive device 106. In such a case, the CPU 210 may select the highlight area of which the total evaluation value is the highest. Moreover, the CPU 210 may select the highlight area designated by the operator through the input device 213.

In a step S312, the CPU 210 increments the variable N. When the variable N is incremented, the magnification of the microscopic device 103 will be changed to the next higher magnification. In a step S313, the CPU 210 determines whether the value of the variable N reaches the number size[z_array]
that is the kinds of settable magnifications (the number of elements of z_array). The determination in the step S313 is a process that determines whether a highlight area is detected in the image captured at the highest magnification of the microscopic device 103. When determining NO in the step S313, the CPU 210 returns the flow to the step S303 and repeats the process from the step S303. In this case, the microscopic device 103 is controlled so as to raise the magnification step by step from the low magnification and the highlight area that has not been evaluated is evaluated.

In the meantime, when determining YES in the step S313, the CPU 210 proceeds with the flow to a step S314. For example, the CPU 210 displays the image at the highest magnification like the image 504 in FIG. 5 on the display unit 109. Moreover, the CPU 210 may store the highlight area together with the image to the auxiliary storage device 216 of the storage device 212, for example. Then, the CPU 210 may extract a plurality of highlight areas by repeating the process of the flowchart in FIG. 3, may obtain images of the extracted highlight areas, and may display or store the images. Even if the total evaluation value is less than the threshold, the CPU 210 may control so as to emphatically display at least one area of which the weighted evaluation value in the column 905 in FIG. 9 of any aspect is high and to also display the total evaluation value.

As mentioned above, when there are a plurality of highlight aspects to determine an area suitable for observation of a smear object (sample) and when the microscope magnifications suitable for the respective aspects are different, the evaluation values of the highlight aspects are weighted by the weighting coefficients corresponding to the respective magnifications in this embodiment. Thereby, even when the microscope magnification is changed, the operator can determine a highlight comprehensively, which enables to determine an area suitable for the microscopic examination easily and exactly.

Hereinafter, a second embodiment will be described. In the first embodiment, the CPU 210 raises the microscope magnification step by step, specifies a highlight area, and moves the stage so that the highlight area will enter the visual field of the microscopic device 103. When specifying a plurality of highlight areas, the CPU 210 of the second embodiment raises the microscope magnification in each highlight area and specifies a highlight area at the high magnification. The configuration of the second embodiment is the same as that of the first embodiment.

Figure 10:
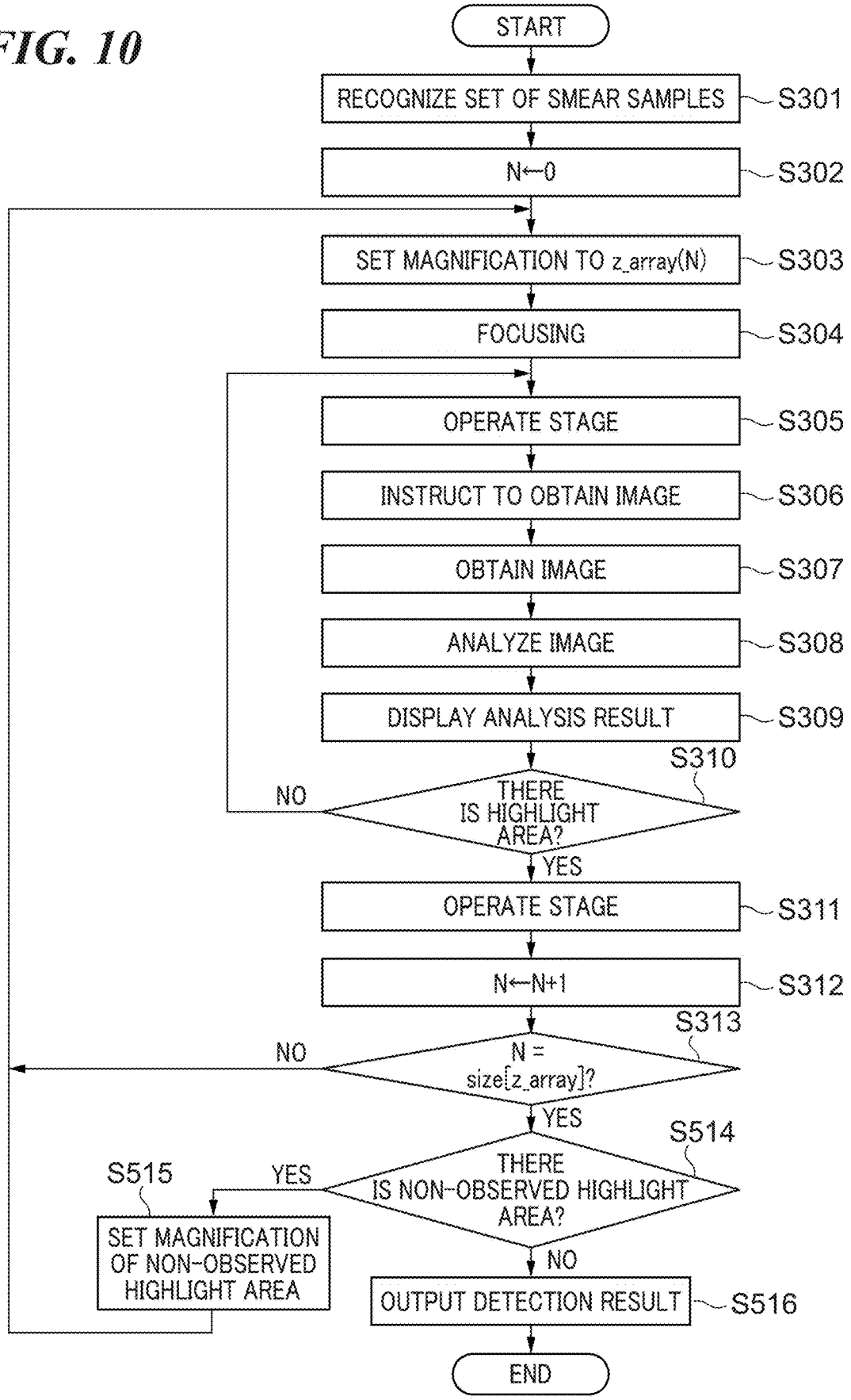
FIG. 10 is a flowchart showing an example of a flow of a process that an image processing apparatus in a second embodiment executes.

FIG. 10 is a flowchart showing an example of a flow of a process that the image processing apparatus 102 in the second embodiment executes. Since the steps S301 through S313 in the flowchart in FIG. 10 are the same as that of the first embodiment (FIG. 3), their descriptions are omitted. When determining YES in the step S313, the CPU 210 proceeds with the flow to a step S514. In the step S514, the CPU 210 determines whether there is a non-observed highlight area. For example, the CPU 210 may store a highlight area that has not been selected among a plurality of highlight areas specified in the image captured at a predetermined magnification into the main storage device 215 as a non-observed highlight area. When there is no non-observed highlight area, the CPU 210 determines NO in the step S514 and proceeds with the flow to a step S515. When there is a non-observed highlight area, the CPU 210 determines YES in the step S514 and proceeds with the flow to a step S516. It should be noted that the CPU 210 may determine NO in the step S514 when the number of the observed highlight areas reaches a predetermined number set up beforehand.

In the step S515, the CPU 210 sets the variable N to an index X that shows the capturing magnification of the image in which the non-observed highlight area is specified. Then, the CPU 210 returns the flow to the step S303. The CPU 210 raises the microscope magnification step by steps and specifies a highlight area by executing the process from the step S303. Thereby, a plurality of highlight areas can be specified in the image of a smear object.

Figure 11:
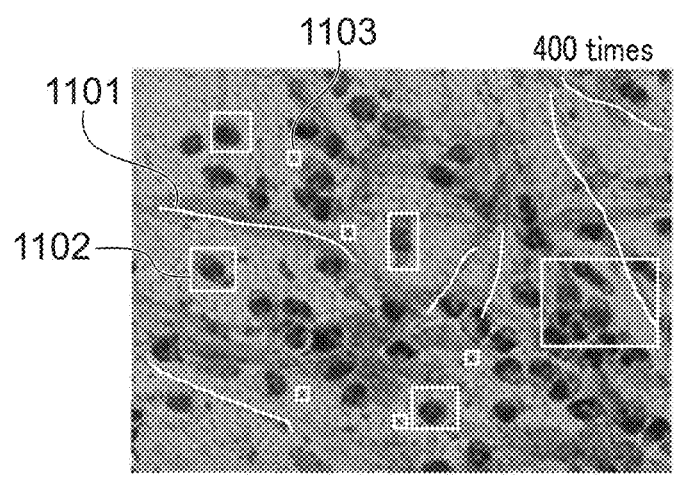
FIG. 11 is a view showing an example of an image displayed in the second embodiment.

In the step S516, the CPU 210 that functions as the analysis unit 108 outputs the image including the specified highlight areas as an analysis result. The CPU 210 controls so as to superimpose a plurality of highlight areas specified in a high magnification image in a low magnification image. FIG. 11 is a view showing an example of an image displayed in the second embodiment. FIG. 11 shows an example of an image of which the microscope magnification is 400 times. In this image, the detection results including a macrophage 1102, fibrin 1101, and bacterium 1103, which are highlight objects detected in the image of which the microscope magnification is 1000 times, are superimposed. That is, the CPU 210 superimposes the information that identifies the objects detected in the high magnification image of 1000 times on the low magnification image of 400 times. Then, the CPU 210 displays the image on which the information identifying the detected objects is superimposed, on the display unit 109.

Also in the first embodiment, the low magnification image on which the information identifying the objects detected in the high magnification image is superimposed may be displayed on the display unit 109. For example, when the operator switches the magnification of the image currently displayed on the display unit 109 to 100 times from 1000 times, the information identifying objects obtained from the image of 100 times, 400 times, or 1000 times may be superimposed on the image of 100 times in the step S314 in FIG. 3.

As mentioned above, in the second embodiment, the highlight objects detected in the high magnification image can be displayed in the low magnification like a bird's-eye view. This enables an easy operation in moving the position of the stage so that the highlight areas will enter the visual field of the microscopic device 103. As a result, the highlights included in the image can be compared efficiently.

In the second embodiment, the CPU 210 may detect the highlights full-automatically by switching the magnification of the microscopic device 103 and by automatically controlling the drive of the stage drive device 106 on the basis of the analysis result. Moreover, the magnification in superimposing the highlight areas in the high magnification image on the low magnification image may be a digital zoom magnification.

As described in the first embodiment, the learned model which achieves the object detection is applicable to detection of objects, such as a cell and bacterium, included in the image. At this time, the CPU 210 may perform machine learning of a learning model by using objects detected in the high magnification image (a high-magnification learning image) as teacher data and using the low magnification image (a low-magnification learning image) as training data. For example, the CPU 210 can adjust coefficient parameters of the learning model by performing the machine learning (deep learning) using the objects detected in the high magnification image (1000 times) as the teacher data and using the low magnification image (400 times) as the training data. In this way, detection accuracy in detecting an object in an unknown image of 400 times is improved by using the learned model that is learned mechanically. Furthermore, when an accumulation pattern is a highlight aspect, the accumulation pattern can be determined more widely and more exactly.

Figure 12:
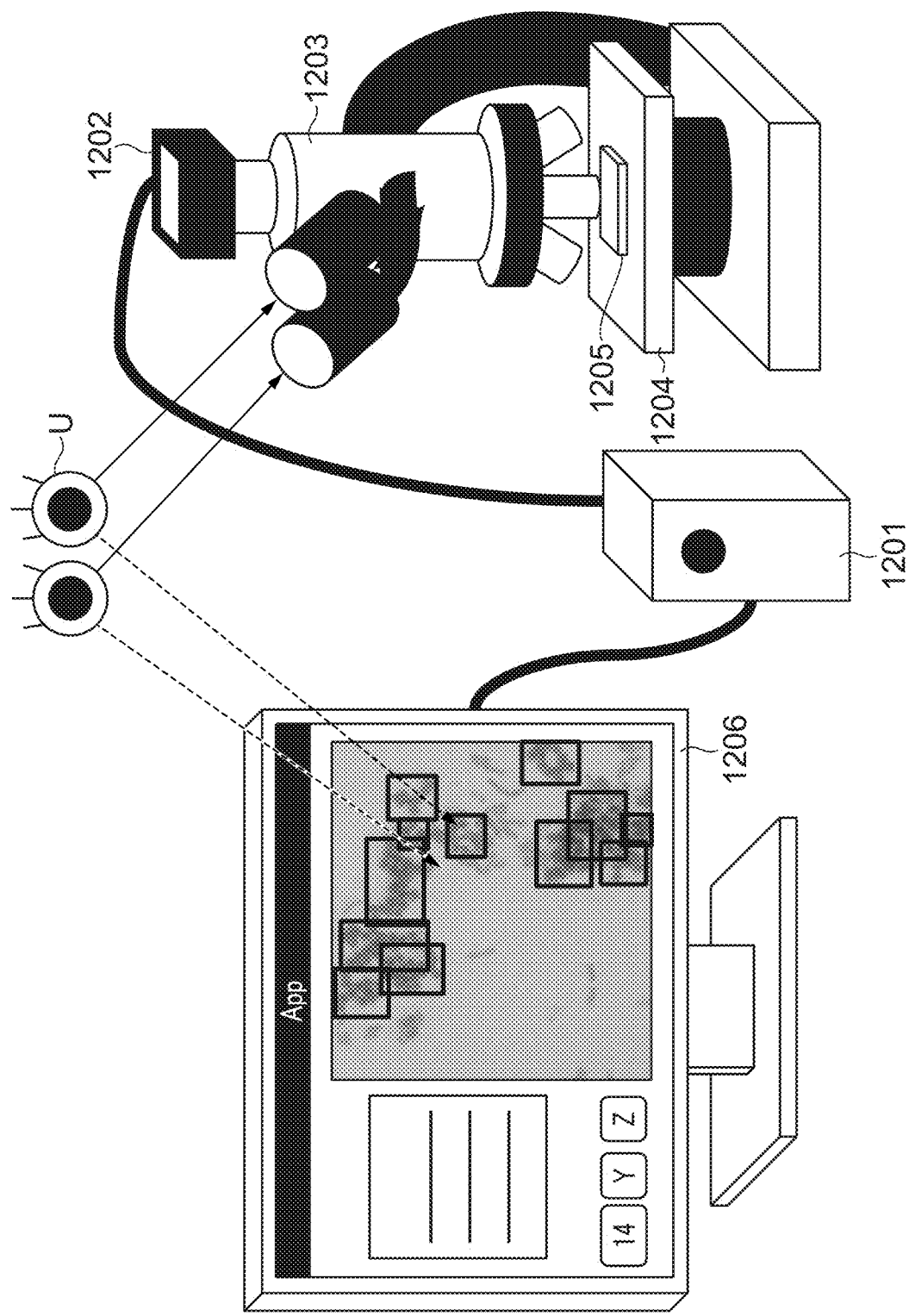
FIG. 12 is a view showing an example of an image processing system according to a third embodiment.

Hereinafter, a third embodiment will be described. FIG. 12 is a view showing an example of an image processing system according to the third embodiment. The image processing system of the third embodiment supports a work that specifies pathogenic bacteria of a patient using the Gram staining, for example. The image processing system in FIG. 12 includes an image processing apparatus 1201, an image obtainment device 1202, a microscopic device 1203, and a display device 1206. The microscopic device 1203 includes a stage 1204 and an object 1205. Moreover, eyes of an operator (worker) U are shown in FIG. 12.

The image processing apparatus 1201 is a computer like the image processing apparatus 102 in FIG. 1. The image obtainment device 1202 is a camera like the image obtainment device 105 in FIG. 1. The microscopic device 1203 can operate the stage 1204 as with the microscopic device 103 in FIG. 1. The object 1205 is created through the process in accordance with the Gram staining. The operator U collects body fluid from a part of a patient's body and puts them on a preparation, a laboratory dish, a slide glass, or the like. It is estimated that the body fluid contains bacteria, especially pathogenic bacteria that cause inflammation in a patient. The operator U trickles stain solution into the collected body fluid and stains. After that, the stained object 1205 is obtained through a work, such as natural drying or forced drying.

The operator U operates the microscopic device 1203 so as to raise the microscope magnification and observes the object 1205. The microscopic device 1203 has eyepiece lenses for both the eyes. The operator U can stereoscopically view an optical image that expands the object 1205 by looking into the eyepiece lenses by both the eyes. The microscopic device 1203 has the stage 1204 on which the object 1205 is mounted. The stage 1204 of the microscopic device 1203 has a mechanism that can operate the position in an X-axis, a Y-axis, and a Z-axis. The Z-axis overlaps with an optical axis of the objective lens of the microscopic device 1203. The X-axis and Y-axis intersect perpendicularly with the Z-axis.

The image obtainment device 1202 is attached to the microscopic device 1203 at an end of an optical path that is different from the optical paths toward the eyepiece lenses. The image obtainment device 1202 can capture a sight approximately similar to the sight observed by the eyepiece lenses. However, the image captured by the image obtainment device 1202 cannot be viewed stereoscopically.

The image processing apparatus 1201 is connected with the image obtainment device 1202, microscopic device 1203, and display device 1206. The configuration of the image processing apparatus 1201 is the same as that of the image processing apparatus 102 in FIG. 1. The image processing apparatus 1201 includes a storage device that stores a predetermined application programs. A CPU of the image processing apparatus 1201 runs the application programs. Thereby, various kinds of functions that the applications of the image processing apparatus 1201 provide are achieved. The applications of the image processing apparatus 1201 have a function that displays a GUI screen on the display device 1206. Hereinafter, the configuration of the image processing apparatus 1201 shall be the same as that of the image processing apparatus 102 in FIG. 1, and the CPU 210 of the image processing apparatus 1201 shall run the applications.

While the operator U is working, the image obtainment device 1202 shall continuously capture the object. The image captured by the image obtainment device 1202 is transmitted to the image processing apparatus 1201 and is displayed on the display device 1206. The CPU 210 of the image processing apparatus 1201 continuously obtains the image captured by the image obtainment device 1202 and applies various kinds of processes to the obtained image.

Hereinafter, an issue that the third embodiment solves will be described. In the image processing system shown in FIG. 12, when observing the object 1205, the operator U needs to move visual lines between a case looking into the eyepiece lenses of the microscopic device 1203 and a case looking at the display device 1206. Generally, the operator U is required to find an area of the object 1205 suitable for observation quickly and to specify pathogenic bacteria at a high probability. During observation, the operator U basically uses the eyepiece lenses of the microscopic device 1203 that enable the stereoscopic view and enables the observation of the object 1205 at high image quality. In the meantime, when storing the image captured by the image obtainment device 1202, the operator U looks at the screen of the display device 1206. Accordingly, it is necessary to move the visual lines to the display device 1206 from the eyepiece lenses of the microscopic device 1203. The movement of the visual lines becomes a burden to the operator U. Accordingly, the third embodiment supports the operator in observing an object (the object 1205).

Figure 13A:
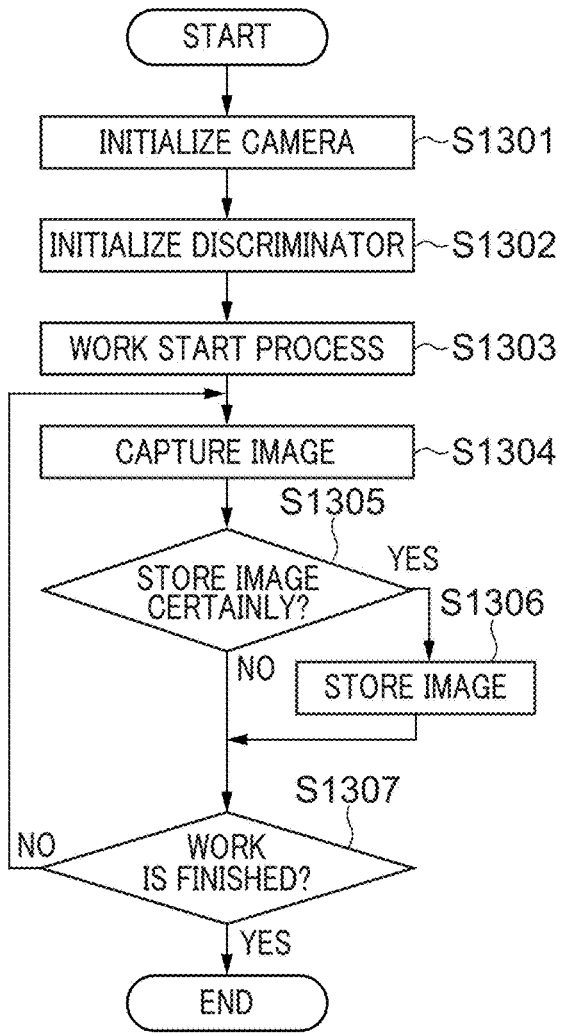
FIG. 13A and FIG. 13B are flowcharts showing examples of flows of processes that an image processing apparatus in the third embodiment executes.
Figure 13B:
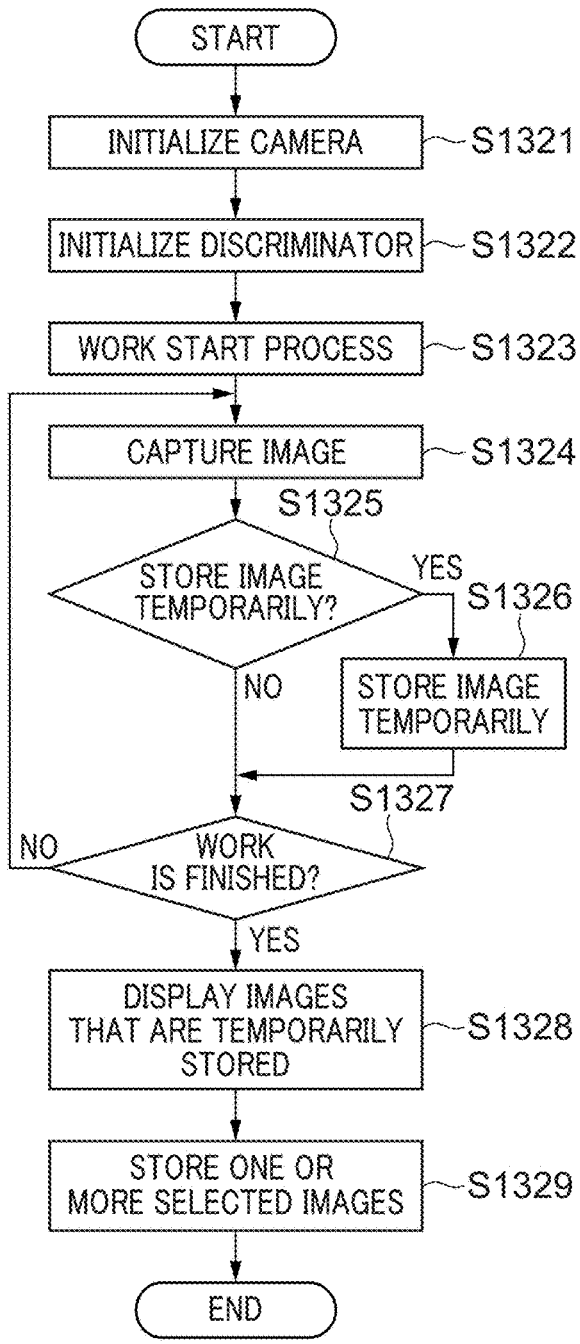

FIG. 13A and FIG. 13B are flowcharts showing examples of flows of processes that the image processing apparatus in the third embodiment executes. In the third embodiment, a process that automatically stores a specific image during the work of the operator U or a process that recommends storing the specific image after finishing the work is performed. FIG. 13A shows an example of the flow of the process that automatically stores a specific image during the work of the operator U. In a step S1301, the CPU 210 initializes the image obtainment device (camera) 1202. For example, the CPU 210 may perform the process in the step S1301 in response to an operation starting the above-mentioned application as a trigger. When the process in the step S1301 is performed, the image obtainment device 1202 that is attached to the microscopic device 1203 is initialized. At this time, resolution, sensitivity, shutter speed, etc. of the image obtainment device 1202 are set to values suitable for the observation of the object 1205.

In a step S1302, the CPU 210 initializes a discriminator. The discriminator is one of functions of the application that the CPU 210 runs. The details will be mentioned later. In a step S1303, the CPU 210 executes a work start process. For example, when the GUI screen displayed on the display device 1206 is operated to start the work to observe the object 1205, the CPU 210 notifies the application of a work start instruction in response to the reception of the operation concerned.

In a step S1304, the CPU 210 controls the image obtainment device 1202 to capture an enlarged image of the object 1205 in response to the notification of the work start instruction. In a step S1305, the CPU 210 determines whether the image captured by the image obtainment device 1202 should be certainly stored using the discriminator. Details about the determination by the discriminator will be mentioned later. When determining YES in the step S1305, the CPU 210 proceeds with the flow to a step S1306. In the step S1306, the CPU 210 stores the image captured in the step S1304 into the auxiliary storage device 216. When determining NO in the step S1305 or when performing the process in the step S1306, the CPU 210 proceeds with the flow to a step S1307.

In the step S1307, the CPU 210 determines whether the work to observe the object 1205 has been finished. For example, the operator U shall instruct to finish the application through the GUI screen currently displayed on the display device 1206. In response to reception of the instruction concerned, the CPU 210 recognizes the finish of the work and finishes the application.

As mentioned above, the discriminator that is one of the functions of the application that the CPU 210 runs determines whether the image is stored or discarded. And the CPU 210 stores the image automatically according to the determination result. Thereby, the operator U can store the specific image while observing the object 1205 without moving the visual lines to the GUI screen displayed on the display device 1206. As a result, the operator U can be supported in observing an object (the object 1205).

FIG. 13B shows an example of a flow of the process that recommends storing the specific image after finishing the work. Since steps S1321, S1322, S1323, and S1324 are the same as the steps S1301, S1302, S1303, and S1304, their descriptions are omitted. In a step S1325, the CPU 210 determines whether the captured image is stored temporarily. When determining YES in the step S1325, the CPU 210 proceeds with the flow to a step S1326. In the step S1326, the CPU 210 stores the obtained image temporarily in the main storage device 215, for example. When determining NO in the step S1325 or when performing the process in the step S1326, the CPU 210 proceeds with the flow to a step S1327. The process in the step S1327 is the same as that in the step S1307. Although the image is stored in the steps S1305 and S1306, the image is stored temporarily in the steps S1325 and S1326.

In a step S1328, the CPU 210 controls to display the images (an image group) stored temporarily into the main storage device 215 in the step S1326 on the display device 1206. Thereby, a list of the image group is displayed on the GUI screen displayed on the display device 1206. For example, the GUI screen shall include check boxes corresponding to the respective images of the image group. The operator U can select an image to be saved by checking a check box. When the operator U gives an instruction to the image processing apparatus 1201 to save the image, the CPU 210 receives the instruction concerned. In a step S1329, the CPU 210 stores at least one image selected among the image group into the auxiliary storage device 216. In the process of the flowchart in FIG. 13B, the discriminator of the application that the CPU 210 runs stores the specific images temporarily and presents the specific images that are stored temporarily to the operator U. Then, a work that stores an image certainly is performed according to an operation by the operator U.

Figure 14A:
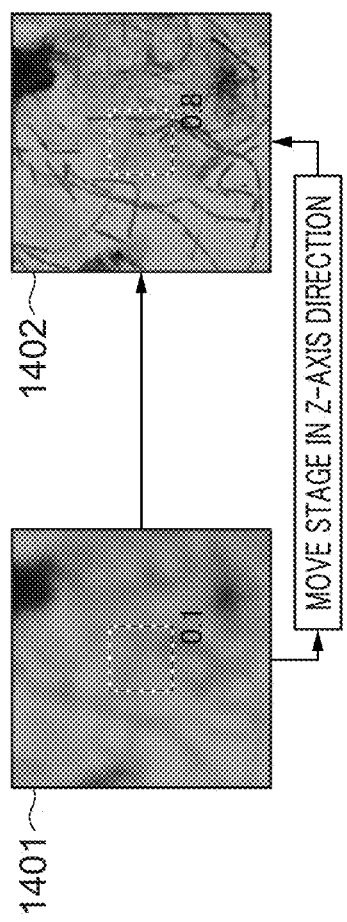
FIG. 14A, FIG. 14B, and FIG. 14C are views showing a first example of a determination process by a discriminator.
Figure 14B:
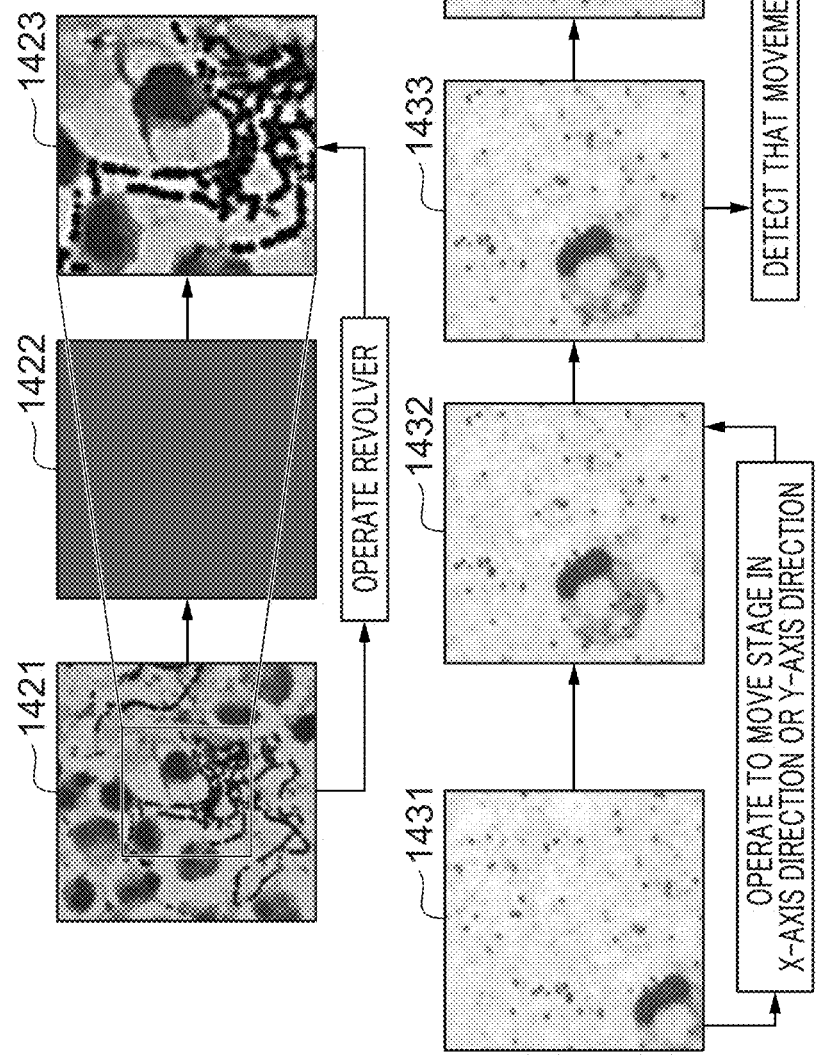
Figure 14C:

FIG. 14A, FIG. 14B, and FIG. 14C are views showing a first example of a determination process by the discriminator. As mentioned above, the determination process in the steps S1305 and S1325 is executed by the discriminator of the application that the CPU 210 runs. In the first example shown in FIG. 14A, FIG. 14B, and FIG. 14C, the discriminator of the application executed by the CPU 210 executes the determination process using a rule base.

FIG. 14A shows an example of the determination process by the discriminator based on a focusing state of an image. An image 1401 is an example of the image captured in the step S1304 or S1324. The image 1401 is a defocus image. At this time, an optical image that the operator U looks through the eyepiece lenses of the microscopic device 1203 is also a defocus image, which is an obstacle to observation of bacteria. When the stage 1204 of the microscopic device 1203 on which the object 1205 is put is moved in a Z-axis direction, a focused image 1402 is obtained. The stage 1204 may be moved according to an operation of the operator U or may be moved by the image processing apparatus 1201.

The CPU 210 may superimpose numerical values that show defocus amounts in any places (for example, center places) in the images 1401 and 1402 as shown in FIG. 14A. In this case, the numerical value increases as the defocus amount decreases. The discriminator of the application that the CPU 210 runs may determine to store an image certainly or to store an image temporarily, when the numerical value showing the defocus amount exceeds a predetermined threshold, for example.

An arbitrary method is applicable to convert the defocus amount into a numerical value. For example, a method that obtains a spatial frequency component of an image by applying the space Fourier transformation and analyzes a high frequency component may be used. Moreover, a method that applies the Laplacian filter to an image and refers to pixel values of an edge extracted deeply may be applied. Since the discriminator of the application that the CPU 210 runs determines as mentioned above, a useful image (focused image) suitable for the observation of bacteria can be stored certainly or temporarily.

FIG. 14B shows an example of a determination process by the discriminator based on the switching of the magnification of the microscopic device 1203. An image 1421 is an example of the image captured in the step S1304 or S1324. After the image obtainment device 1202 captures the image 1421, the operator U shall operate a revolver of the microscopic device 1203. The revolver is a mechanism that switches the objective lenses of the microscopic device 1203. When specifying bacteria included in the object 1205, the operator U first retrieves an area suitable for the observation of bacteria with the objective lens having a large field angle. Then, when discovering a suitable area, the operator U switches to the objective lens having a narrower field angle with the revolver, and observes the bacteria in an expanded field. An image 1422 is an image that is captured by image obtainment device 1202 during the operation of the revolver by the operator U. When the revolver is operated, the image and the optical image become dark because the optical path from the light source of the microscopic device 1203 to the image obtainment device 1202 and the eyepiece lenses is obstructed temporarily.

The discriminator of the application that the CPU 210 runs can detect whether the operator U operates the revolver on the basis of drop of an average luminance of the image 1422. An image 1423 is an image that is captured by the image obtainment device 1202 after the operator U switches the objective lens by operating the revolver. When the average luminance of the obtained image becomes equal to or less than a predetermined threshold (when it becomes dark), the discriminator of the application that the CPU 210 runs detects the operation of the revolver and stores the image 1423 certainly or temporarily. At this time, the discriminator of the application that the CPU 210 runs may store the images 1421 and 1423 certainly or temporarily. Thereby, an image of an area suitable for observation of bacteria discovered by the operator U and an expanded image of the suitable area can be selected and stored.

FIG. 14C shows an example of the determination process by the discriminator based on a movement of an image. An image 1431 is an example of the image captured in the step S1304 or S1324. After the image obtainment device 1202 captures the image 1431, the operator U shall operate so as to move the stage 1204 of the microscopic device 1203 on which the object 1205 is put in an X-axis direction or a Y-axis direction in order to retrieve an area suitable for observation of bacteria. A visual field of an image 1432 that the image obtainment device 1202 captures after the movement of the stage 1204 is different from the visual field of the image 1431.

The image obtainment device 1202 repeats capturing an image for every prescribed period (continuously) while moving the stage 1204. An image 1433 and an image 1434 shall be obtained in order by the capturing for every prescribed period. At this time, the discriminator of the application that the CPU 210 runs shall detect that a movement between the images 1433 and 1433 is scarce. An arbitrary method can be employed to quantify a movement between images. For example, a magnitude of a movement between images can be quantified by using a synthesized vector of many motion vectors defined between pixels having a similar pixel value. The discriminator of the application that the CPU 210 runs detects that the movement is scarce, when the magnitude of the movement between the images is equal to or less than a predetermined threshold. At this time, the discriminator of the application that the CPU 210 runs may store the image 1434 certainly or temporarily. There is a high probability that the operator U gazed on the image 1434 for a definite period while stopping the operation of the stage. Accordingly, the discriminator of the application that the CPU 210 runs can select an image that is gazed by the operator U during observation and can store it certainly or temporarily.

FIG. 15A and FIG. 15B are views showing a second example of the determination process by the discriminator. In the second example shown in FIG. 15A and FIG. 15B, the discriminator of the application that the CPU 210 runs performs a determination process using a learned model generated by machine learning. The learned model that performs the object detection described in the first embodiment is applicable. For example, a neural network that performs an inference process that detects bacteria reflected on an image by deep learning of the neural network shall be used. In this case, the discriminator of the application that the CPU 210 runs performs the inference process (object detection) that detects bacteria reflected on an image using the neural network concerned.

An image 1501 in FIG. 15A is an example of the image captured in the step S1304 or S1324. The discriminator of the application that the CPU 210 runs performs the inference process that detects bacteria reflected in an image using the above-mentioned neural network. The CPU 210 generates an image 1502 by superimposing information about the bacteria detected by the inference process on the image 1501. Moreover, the CPU 210 determines whether the image 1501 should be stored certainly or temporarily on the basis of the number, type, or size of the bacteria obtained by the inference process. For example, the CPU 210 stores the image 1501 certainly or temporarily, when the number of the bacteria obtained by the inference process exceeds a predetermined number or when the size of the bacteria exceeds a predetermined size. Moreover, the CPU 210 stores the image 1501 certainly or temporarily, when the type of the bacteria obtained by the inference process is a specific type defined beforehand. Thereby, at least one image that is characterized in the bacteria can be automatically selected from among a plurality of images and can be stored certainly or temporarily.

An image 1511 in FIG. 15B is an example of the image captured in the step S1304 or S1324. A CNN (convolutional neural network) is used in the example in FIG. 15B. The image 1511 is inputted into a CNN layer 1512. The image 1511 is processed into a format suitable for an input layer of the CNN layer 1512. The CNN layer 1512 and a CNN layer 1513 are layers that extract a characteristic feature of an image. Although there are two CNN layers in the example in FIG. 15B, one CNN layer or three or more CNN layers may be employed. An FC layer 1514 is a fully coupled layer. The FC layer 1514 performs dimensional compression.

The layer structure of the CNN in FIG. 15B is an example, and the CNN can employ an arbitrary layer structure. For example, the CNN can employ a structure that alternately combines pooling layers and convolutional layers. The CNN may include a dropout layer, a batch normalization layer, etc. Moreover, an RNN (a recurrent neural network) may be applied instead of the CNN. The CNN and RNN shall perform machine learning beforehand using the learning sets described in the first embodiment so that information about bacteria can be detected.

The discriminator of the application that the CPU 210 runs performs an inference process that detects information about bacteria from the image 1511 using the above-mentioned CNN (or RNN). Thereby, at least one image that is characterized in the bacteria can be automatically selected from among a plurality of images and can be stored certainly or temporarily.

As mentioned above, in the third embodiment, the discriminator of the application that the CPU 210 runs automatically stores the image that the image obtainment device 1202 captured certainly or temporarily using the rule base or the learned model. The image that the image obtainment device 1202 captures is automatically stored certainly or temporarily, while the operator U is looking into the eyepiece lenses of the microscopic device 1203 without looking at the display device 1206. Accordingly, since it is not necessary to move the visual lines, the support that reduces the burden of the operator U is achievable. Although the above-mentioned embodiments describe the examples that use what is called a general microscope, the present disclosure is not limited to this. For example, the image obtainment device 105 of the image pickup apparatus 101 shown in FIG. 1 may be provided with an optical system of which a function is approximately similar to that of the microscopic device 103 so as to configure as an image pickup unit including a microscope. This can miniaturize an inspection apparatus (the image processing system 100) using the Gram staining as compared with a configuration that is separately provided with a microscope or a configuration that connects to a separate microscope.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-018361, filed Feb. 8, 2021, which is hereby incorporated by reference herein in its entirety.

What is claimed is:

1. An image processing apparatus comprising:
a storage device storing a weighting coefficient table including different weighting coefficients for respective magnification levels of a microscope, defined for each of a plurality of kinds of aspects in observing a detection target with the microscope; and
at least one processor configured to perform operations of;
obtaining an image captured from an object observed by using the microscope;
specifying at least one area in the image that is to be captured at an expanded magnification, based on first evaluation values for a detection target included in the image and weighting coefficients in the weighting coefficient table, wherein the first evaluation values evaluate, based on the image, the plurality of kinds of aspects in observing the detection target with the microscope, and the weighting coefficients are respectively defined for the plurality of kinds of aspects for a magnification level of the microscope used for capturing the image, and after capturing the expanded magnification image,
specifying at least one area in the expanded magnification image that is to be captured at a further expanded magnification, based on second evaluation values for the detection target included in the image and second weighting coefficients in the weighting coefficient table, wherein the second evaluation values evaluate, based on the image, the plurality of kinds of aspects in observing the detection target with the microscope, and the second weighting coefficients are respectively defined for the plurality of kinds of aspects for a second magnification level of the microscope used for capturing the image,
wherein the second weighting coefficients are different from the first weighting coefficients.

2. The image processing apparatus according to claim 1, wherein the detection target includes at least one of a bacterium, a microbe, or a cell.

3. The image processing apparatus according to claim 1, wherein an area of which a second evaluation value that is based on the first evaluation values and the weighting coefficients is equal to or more than a predetermined threshold is specified as the at least one area among areas included in the image.

4. The image processing apparatus according to claim 3, wherein the second evaluation value is superimposed in the at least one area specified.

5. The image processing apparatus according to claim 1, wherein the aspects include at least one of a thickness of a smear, a staining state, a neutrophil and squamous cell, a fibrin deposition, a ciliated epithelial cell, a phagocytosis image, and a bacterium.

6. The image processing apparatus according to claim 5, wherein, the neutrophil and squamous cell, and the ciliated epithelial cell are excepted from the aspects in a case where the object is not sputum.

7. The image processing apparatus according to claim 1, wherein the at least one area specified in the image is displayed distinguishably.

8. The image processing apparatus according to claim 1, further comprising a controller configured to move a stage on which the object is put so that an area among the specified at least one area will be located at a center of a visual field of the microscope.

9. The image processing apparatus according to claim 3, further comprising a controller configured to move a stage on which the object is put so that an area of which the second evaluation value is highest among a plurality of specified areas will be located at a center of a visual field of the microscope.

10. The image processing apparatus according to claim 1, wherein a plurality of areas are set in the image based on a relation between a magnification prior to expansion of the magnification and a magnification that is expanded next time.

11. The image processing apparatus according to claim 1, wherein information that identifies at least one detection target detected in a high magnification image captured by expanding the magnification of the microscope is superimposed on a low magnification image captured prior to expansion of the magnification of the microscope.

12. The image processing apparatus according to claim 1, wherein the detection target is detected from the image using a learned model subjected to machine learning so as to detects the detection target, and wherein the learned model is subjected to the machine learning by using objects detected in a high-magnification learning image as teacher data and using a low-magnification learning image of which the magnification is lower than that of the high-magnification learning image as training data.

13. A control method for an image processing apparatus comprising a storage device storing a weighting coefficient table including different weighting coefficients for respective magnification levels of a microscope, defined for each of a plurality of kinds of aspects in observing a detection target with the microscope, the control method comprising:

obtaining an image captured from an object observed by using the microscope;

specifying at least one area in the image that is to be captured at an expanded magnification, based on first evaluation values for a detection target included in the image and weighting coefficients in the weighting coefficient table, wherein the first evaluation values evaluate, based on the image, the plurality of kinds of aspects in observing the detection target with the microscope, and the weighting coefficients are respectively defined for the plurality of kinds of aspects for a magnification level of the microscope used for capturing the image, and after capturing the expanded magnification image, specifying at least one area in the expanded magnification image that is to be captured at a further expanded magnification, based on second evaluation values for the detection target included in the image and second weighting coefficients in the weighting coefficient table, wherein the second evaluation values evaluate, based on the image, the plurality of kinds of aspects in observing the detection target with the microscope, and the second weighting coefficients are respectively defined for the plurality of kinds of aspects for a second magnification level of the microscope used for capturing the image, wherein the second weighting coefficients are different from the first weighting coefficients.

14. A non-transitory computer-readable storage medium storing a control program causing a computer to execute a control method for an image processing apparatus, the image processing apparatus comprising a storage device storing a weighting coefficient table including different weighting coefficients for respective magnification levels of a microscope, defined for each of a plurality of kinds of aspects in observing a detection target with the microscope, the control method comprising:

obtaining an image captured from an object observed by using the microscope;

specifying at least one area in the image that is to be captured at an expanded magnification, based on first evaluation values for a detection target included in the image and weighting coefficients in the weighting coefficient table, wherein the first evaluation values evaluate, based on the image, the plurality of kinds of aspects in observing the detection target with the microscope, and the weighting coefficients are respectively defined for the plurality of kinds of aspects for a magnification level of the microscope used for capturing the image, and after capturing the expanded magnification image, specifying at least one area in the expanded magnification image that is to be captured at a further expanded magnification, based on second evaluation values for the detection target included in the image and second weighting coefficients in the weighting coefficient table, wherein the second evaluation values evaluate, based on the image, the plurality of kinds of aspects in observing the detection target with the microscope, and the second weighting coefficients are respectively defined for the plurality of kinds of aspects for a second magnification level of the microscope used for capturing the image, wherein the second weighting coefficients are different from the first weighting coefficients.

15. The image processing apparatus according to claim 1, wherein the at least one area is specified based on a total evaluation value obtained by multiplying the first evaluation values by the respective weighting coefficients for the magnification level to calculate weighted evaluation values, and adding up and normalizing the calculated weighted evaluation values.

* * * * *